(12) United States Patent
Sakaki et al.

(10) Patent No.: US 7,198,129 B2
(45) Date of Patent: Apr. 3, 2007

(54) MOTORCYCLE

(75) Inventors: Hideo Sakaki, Wako (JP); Fuminori Kamemizu, Wako (JP); Kazuhiko Mori, Wako (JP); Seiichi Kurohori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 10/966,172

(22) Filed: Sep. 29, 2004

(65) Prior Publication Data
US 2005/0082100 A1 Apr. 21, 2005

(30) Foreign Application Priority Data
Oct. 10, 2003 (JP) .............................. 2003-352968

(51) Int. Cl.
*B62K 11/02* (2006.01)
*B62K 19/30* (2006.01)

(52) U.S. Cl. .................. 180/219; 180/229; 180/69.4

(58) Field of Classification Search ............... 180/219, 180/69.4, 69.5, 229
See application file for complete search history.

(56) References Cited

U.S. PATENT DOCUMENTS

| 4,871,041 | A | * | 10/1989 | Saito et al. ................. 180/219 |
| 4,907,428 | A | | 3/1990 | Nakashima et al. |
| 5,291,067 | A | | 3/1994 | Nakajima et al. |
| 5,533,783 | A | | 7/1996 | Harms et al. |
| 6,249,744 | B1 | * | 6/2001 | Morita ....................... 701/213 |
| 2003/0222473 | A1 | | 12/2003 | Yamamoto et al |

FOREIGN PATENT DOCUMENTS

| EP | 0800988 | 10/1997 |
| EP | 0825101 | 2/1998 |
| EP | 0856462 | 5/1998 |
| EP | 1 520 968 | 4/2005 |
| FR | 2802889 | 6/2001 |
| JP | 9-11952 | 1/1997 |
| JP | 10001079 | 1/1998 |
| JP | 11-227658 | 8/1999 |
| JP | 2001-63657 | 3/2001 |
| JP | 180565 | 7/2001 |
| JP | 2001-260968 | 9/2001 |
| JP | 2001-278154 | 10/2001 |
| JP | 2003-285692 | 10/2003 |

* cited by examiner

*Primary Examiner*—Anne Marie Boehler
(74) *Attorney, Agent, or Firm*—Hamre, Schumann, Mueller & Larson, PC

(57) ABSTRACT

A motorcycle in which a fuel tank and a radiator are disposed on the lower side of a floor tunnel portion disposed in the area ranging from the rear side of a head pipe for steerably bearing a front wheel and a steering handle to the lower side of the front end of a rider's seat to make it possible to arrange component parts while effectively utilizing the space on the lower side of the floor tunnel portion.

7 Claims, 21 Drawing Sheets

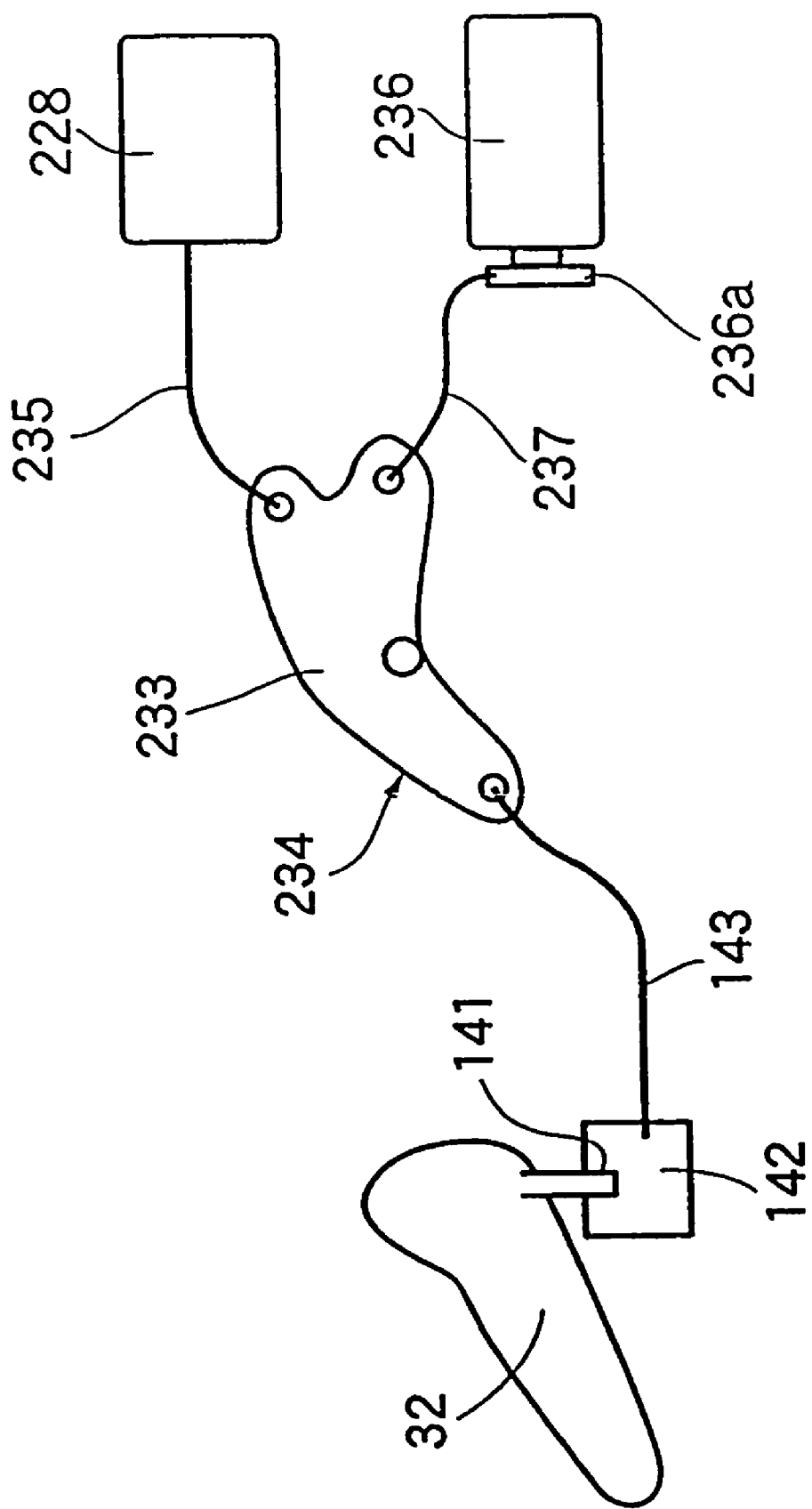

MOTORCYCLE

FIELD OF THE INVENTION

The present invention relates to a motorcycle, particularly to a motorcycle in which a fuel tank and a radiator are disposed on the lower side of a floor tunnel portion disposed in the area ranging from the rear side of a head pipe for steerably bearing a front wheel and a steering handle to the lower side of the front end of a rider's seat.

BACKGROUND OF THE INVENTION

In the conventional motorcycle such as that described in Japanese Patent Laid-open No. 2001-63657, the radiator is disposed on the lower side of a front portion of the floor tunnel portion, and the fuel tank which is elongate in the front-rear direction and has a small height is disposed on the rear side relative to the radiator. Therefore, it cannot be said that the space on the lower side of the floor tunnel portion is utilized effectively, and, of the space on the lower side of the floor tunnel portion, the portion corresponding to a lower portion of the head pipe is left as a dead space. In addition, where a luggage box is disposed on the lower side of the rider's seat, it is inevitable to reduce the depth of the luggage box.

The present invention has been made in consideration of the above-mentioned circumstances. Accordingly, it is an object of the present invention to provide a motorcycle in which component parts can be arranged while effectively utilizing the space on the lower side of a floor tunnel portion.

SUMMARY OF THE INVENTION

In order to attain the above object, in a motorcycle including a fuel tank and a radiator both disposed on the lower side of a floor tunnel portion disposed in the area ranging from the rear side of a head pipe for steerably bearing a front wheel and a steering handle to the lower side of the front end of a rider's seat, the fuel tank extending vertically in the area ranging from the rear side of a lower portion of the head pipe to lower portions of a left-right pair of lower down frames having inclined portions extending rearwardly downwards from the head pipe on the lower side of connection portions, for connection to the head pipe, of a left-right pair of upper down frames extending rearwardly downwards from the head pipe is disposed in a space which is surrounded by the upper down frames and the lower down frames and which is located immediately on the rear side of the front wheel.

The fuel tank elongate in the vertical direction is disposed immediately on the rear side of the front wheel, so that it is possible to prevent the space portion corresponding to a lower portion of the head pipe from becoming a dead space, and to arrange component parts while effectively utilizing the space on the lower side of the floor tunnel portion. In addition, since the fuel tank which would be comparatively heavy in weight is located close to the front wheel, it is possible to enlarge the distributed load of the front wheel and thereby to contrive a higher turning performance. Besides, the fuel tank elongate in the vertical direction makes it possible to comparatively enlarge the residual amount height of the fuel in the condition where the residual fuel amount is small, which is profitable for the suction of the pump where a pump unit is annexed to the fuel tank.

In addition, the radiator is disposed on the rear side of the fuel tank, and a battery is disposed between the radiator and the fuel tank. The fuel tank is made to be elongate vertically, whereby it is possible to set the space on the rear side of the fuel tank to be comparatively wider. In addition, it is possible to dispose the battery as a heavy body at the center in the front-rear direction of the vehicle body, thereby contributing to enhancement of drivability, and to dispose the battery between the heat-radiating radiator and the fuel tank, thereby preventing bad effects of the heat coming from the radiator from being exerted on the fuel tank.

A pump unit contained and disposed in a lower portion of the inside of the fuel tank is attached to the fuel tank from the back side of the fuel tank. The pump unit can be attached to the fuel tank so that the pump unit will not be affected by flying stones, which might fly away attendant on the running of the motorcycle, or by steps present in the road surface.

The pump unit is attached to the fuel tank, with its rotational axis inclined forwardly downwards. A suction port of the pump unit is disposed as close as possible to a bottom portion of the fuel tank, whereby the dead residual amount of the fuel in the fuel tank can minimized.

A reservoir of said radiator is disposed on the lower side of a step floor constituting a part of a vehicle body cover, and a water supply port of the reservoir tank is disposed on the lower side of a maintenance lid detachably attached to a bottom wall of a luggage box disposed on the lower side of the rider's seat.

The radiator is disposed on the rear side of the fuel tank, so that it is easy to set the water supply port of the radiator tank to front on a bottom portion of the rider's seat, to dispose the water supply port at a higher position than in the case of setting the water supply port to front on a step floor present directly above the reservoir tank or the like, and thereby to achieve a favorable water-supplying operation performance.

A water supply port forming member forming the water supply port is supported by a mount portion, for mounting to the vehicle body frame side, of a tension rod provided between a vehicle body frame and a unit swing engine swingably borne on the vehicle body frame. It is possible to support the water supply port forming member on the vehicle body frame, while making it unnecessary to apply a special contrivance for supporting the water supply port forming member on the luggage box side.

The motorcycle includes a fuel injection valve for injecting a fuel supplied from the fuel tank. The fuel in the fuel tank can be effectively supplied to the fuel injection valve by use of the pump unit annexed to the fuel tank in which the residual amount height of the fuel is set comparatively large in the condition where the residual fuel amount is small.

BRIEF DESCRIPTION OF THE DRAWINGS

FIG. 21 is a view showing the general configuration of an emergency unlocking system for a seat lock.

DETAILED DESCRIPTION OF THE INVENTION

Figure 1:
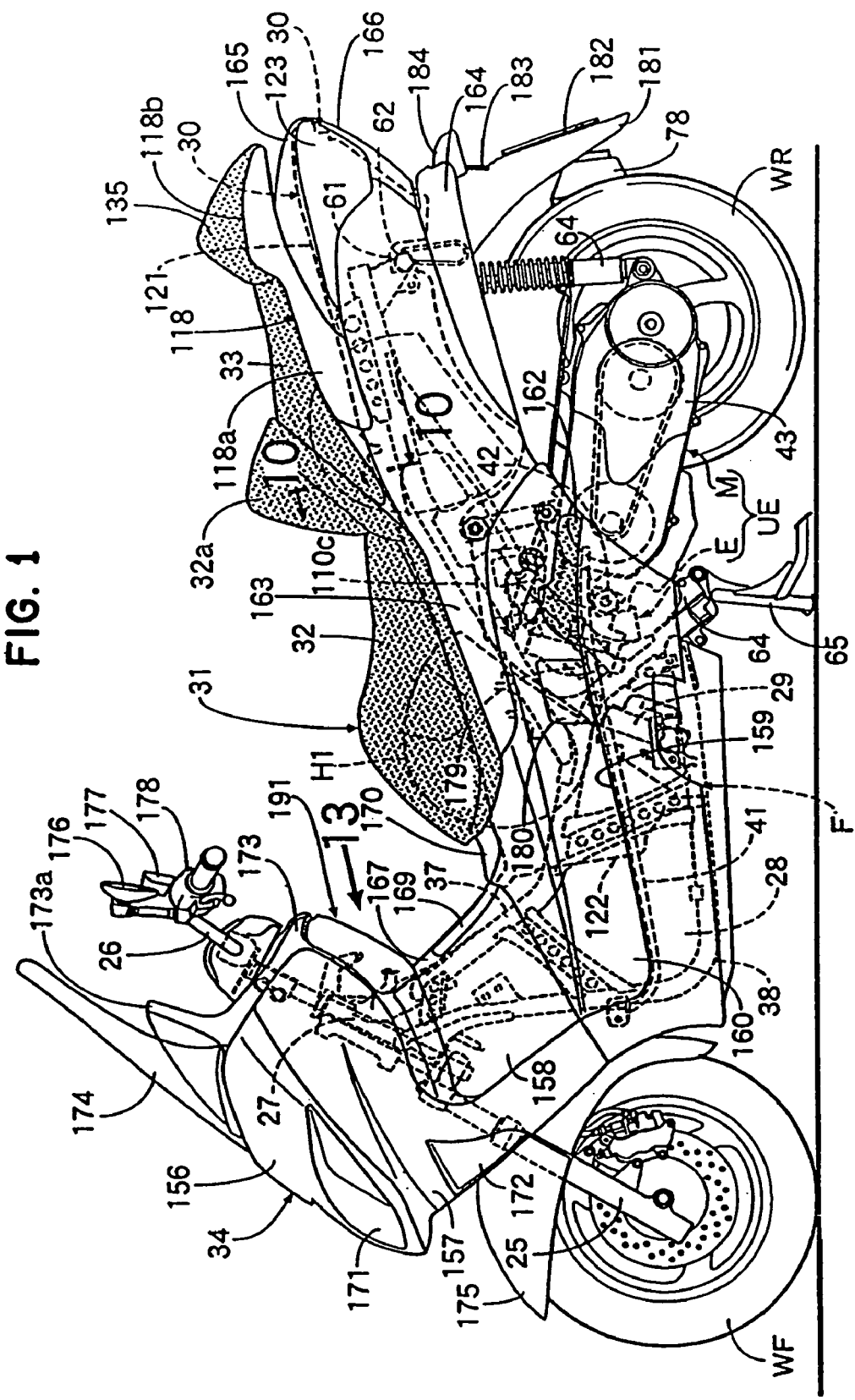
FIG. 1 is a left side view of a motor scooter type vehicle.

First, in FIG. 1, a vehicle body frame F of a motor scooter type vehicle which is a motorcycle includes, at the front end thereof, a front fork 25 for shaft-supporting a front wheel WF and a head pipe 27 for steerably bearing a steering handle 26 connected to the front fork 25, a unit swing engine UE supporting a rear wheel WR at the rear end thereof is vertically swingably borne on an intermediate portion in the front-rear direction of the vehicle body frame F, and a fuel tank 28 elongate vertically in side view and a radiator 29 disposed on the rear side relative to the fuel tank 28 are mounted on the vehicle body frame F on the front side relative to the unit swing engine UE. In addition, a luggage box 30 is mounted to the vehicle body frame F in the manner of covering the unit swing engine UE from the upper side, and a rider's seat 31 configured in a tandem type by including a front seat 32 and a rear seat 33 is mounted on the luggage box 30. Further, a vehicle body cover 34 made of a synthetic resin for covering the vehicle body frame F, a front portion of the unit swing engine UE, the fuel tank 28, the radiator 29 and the luggage box 30 is mounted to the vehicle body frame F.

Figure 2:
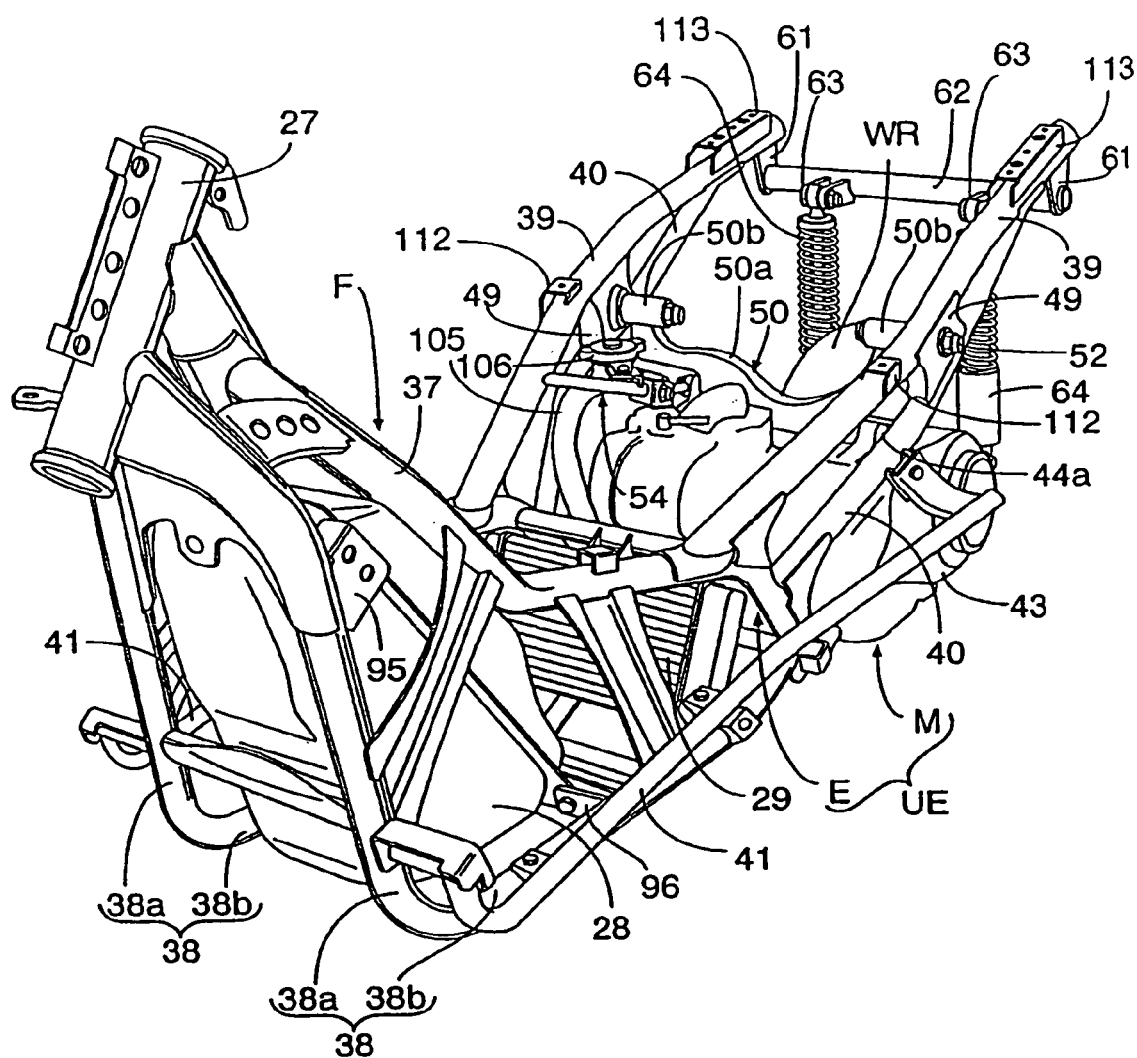
FIG. 2 is a perspective view of a vehicle body frame in the condition where a fuel tank and a radiator are mounted.
Figure 3:
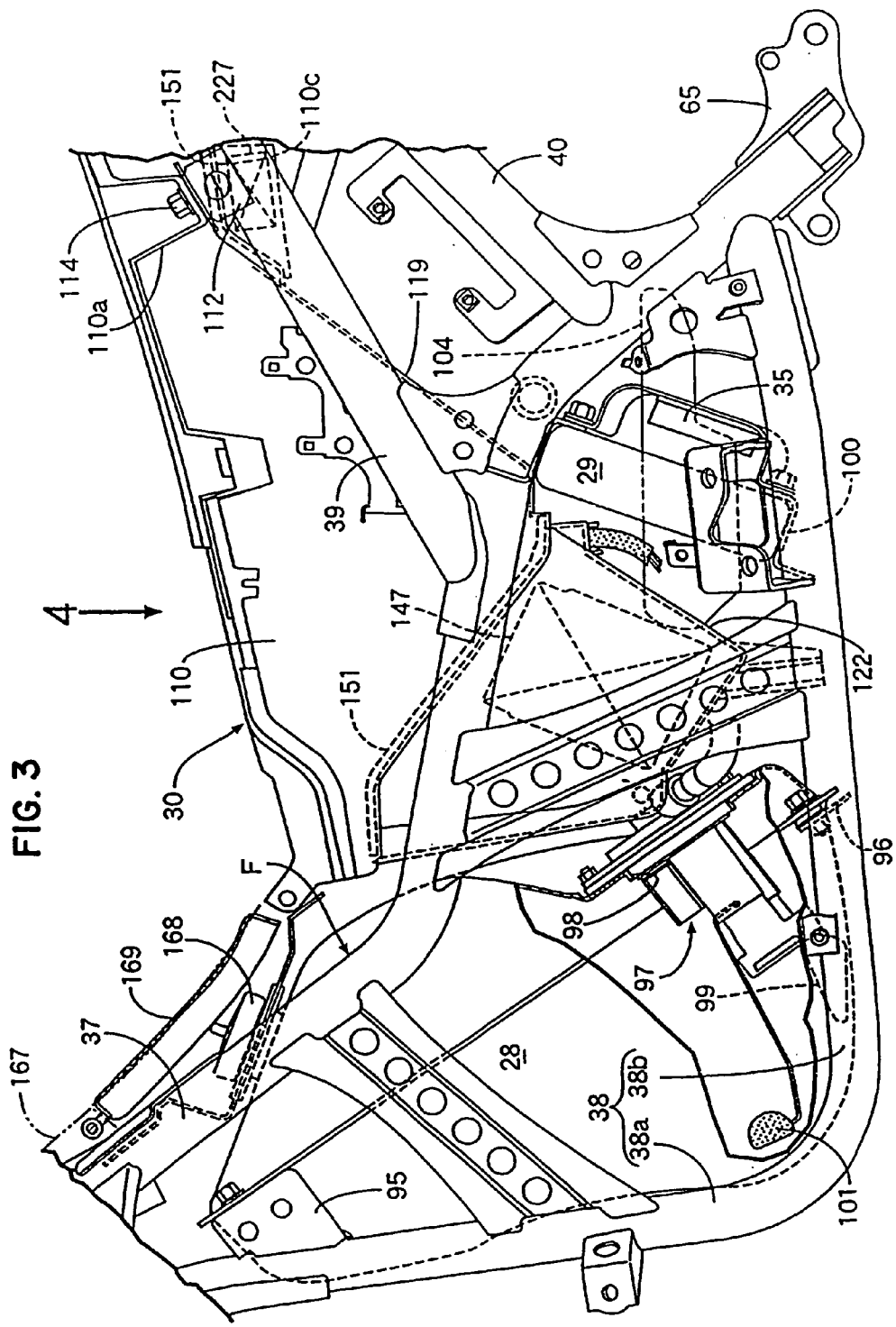
FIG. 3 is a left side view of an intermediate portion in the front-rear direction of the motor scooter type vehicle in the condition where a rider's seat and a vehicle body cover have been removed.

Referring to FIGS. 2 and 3 also, the vehicle body frame F includes the head pipe 27, a left-right pair of upper down frames 37 joined to the head pipe 27 and extended rearwardly downwards, a left-right pair of lower down frames 38, 38 which have horizontal portions 38b integrally joined to the rear ends of inclined portions 38a joined to the head pipe 27 on the lower side relative to the upper down frames 37 and extended rearwardly downwards and which have their rear ends welded to rear end portions of the upper down frames 37, a left-right pair of seat rails 39, 39 extended rearwardly upwards from intermediate portions of both the upper down frames 37, a left-right pair of rear frames 40 for connection between rear portions of the upper down frames 37 and rear portions of the seat rails 39, and a left-right pair of support frames 41, 41 disposed on the outer sides of the upper down frames 37, the lower down frames 25 and the rear frames 40 and extended in the front-rear direction.

The support frames 41 support, from the lower side, step floors 159 possessed by the vehicle body cover 34 on the left and right sides thereof, the front ends of both the support frames 41 are connected to lower portions of the inclined portions 38a of the lower down frames 38, and the rear ends of both the support frame 41 are connected to intermediate portions of the rear frames 40.

Figure 4:
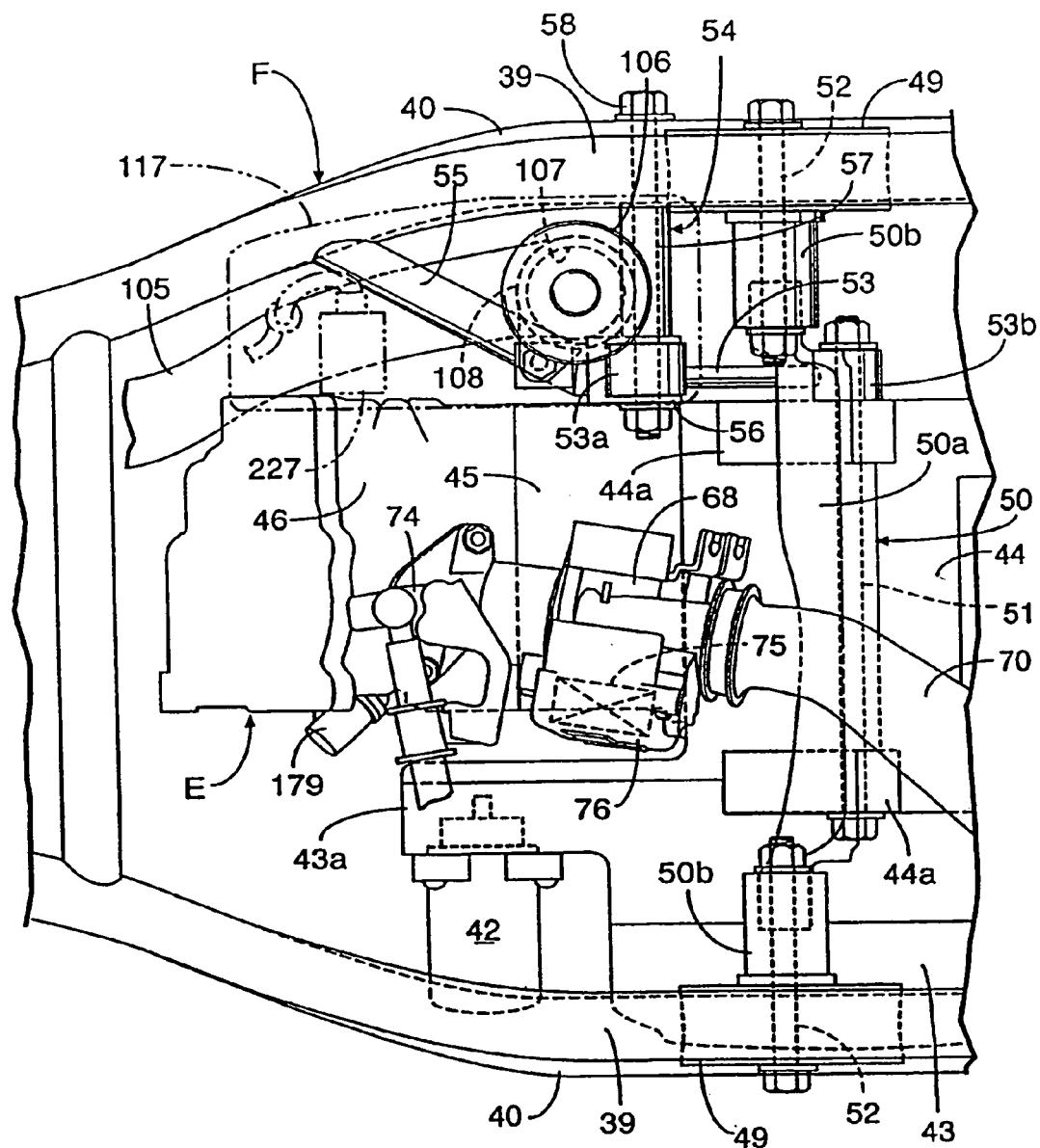
FIG. 4 is a view along arrow 4 of FIG. 3 in the condition where a luggage box has been removed.
Figure 5:
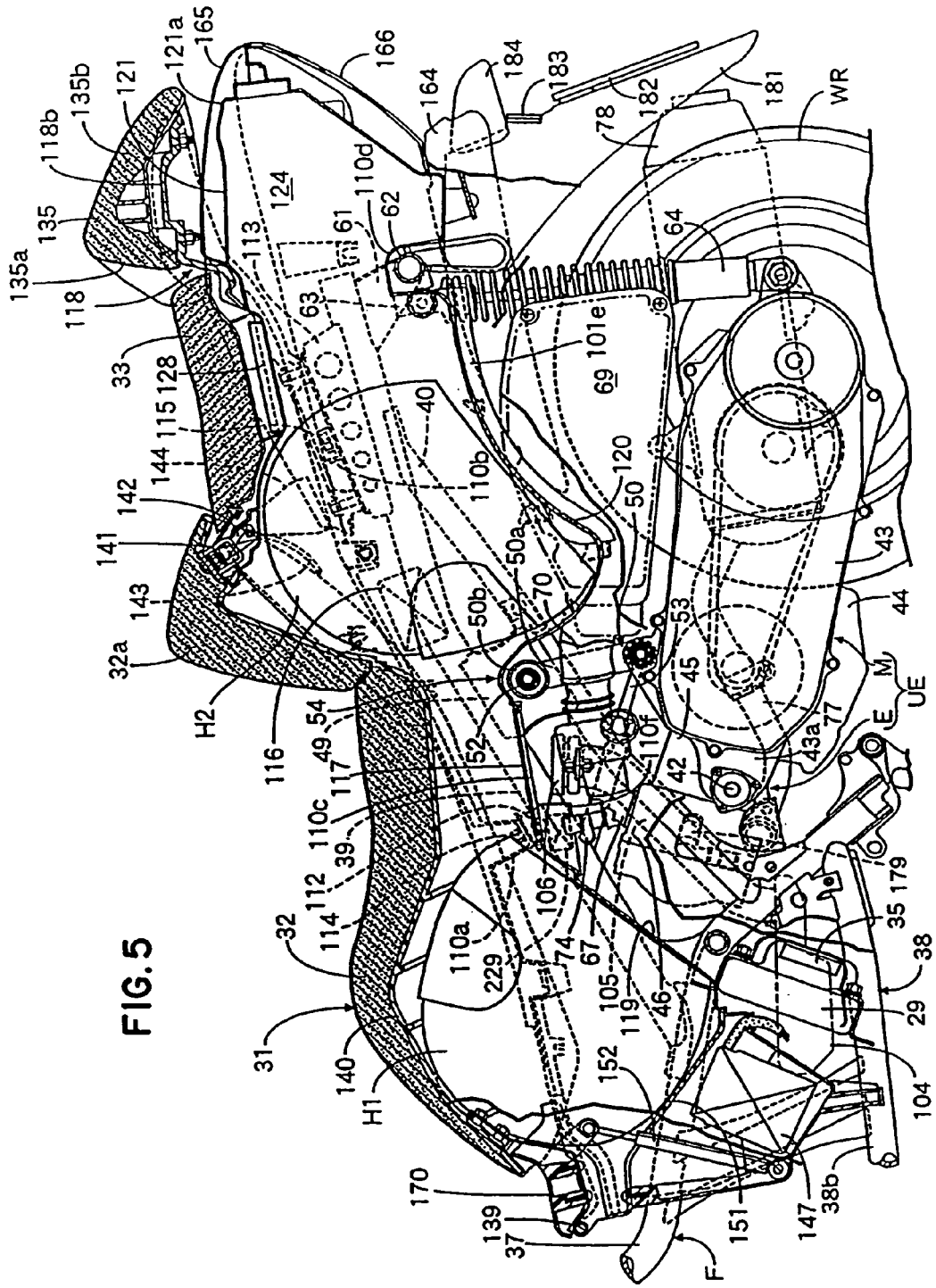
FIG. 5 is an enlarged vertical sectional side view of a rear portion of the motor scooter type vehicle.
Figure 6:
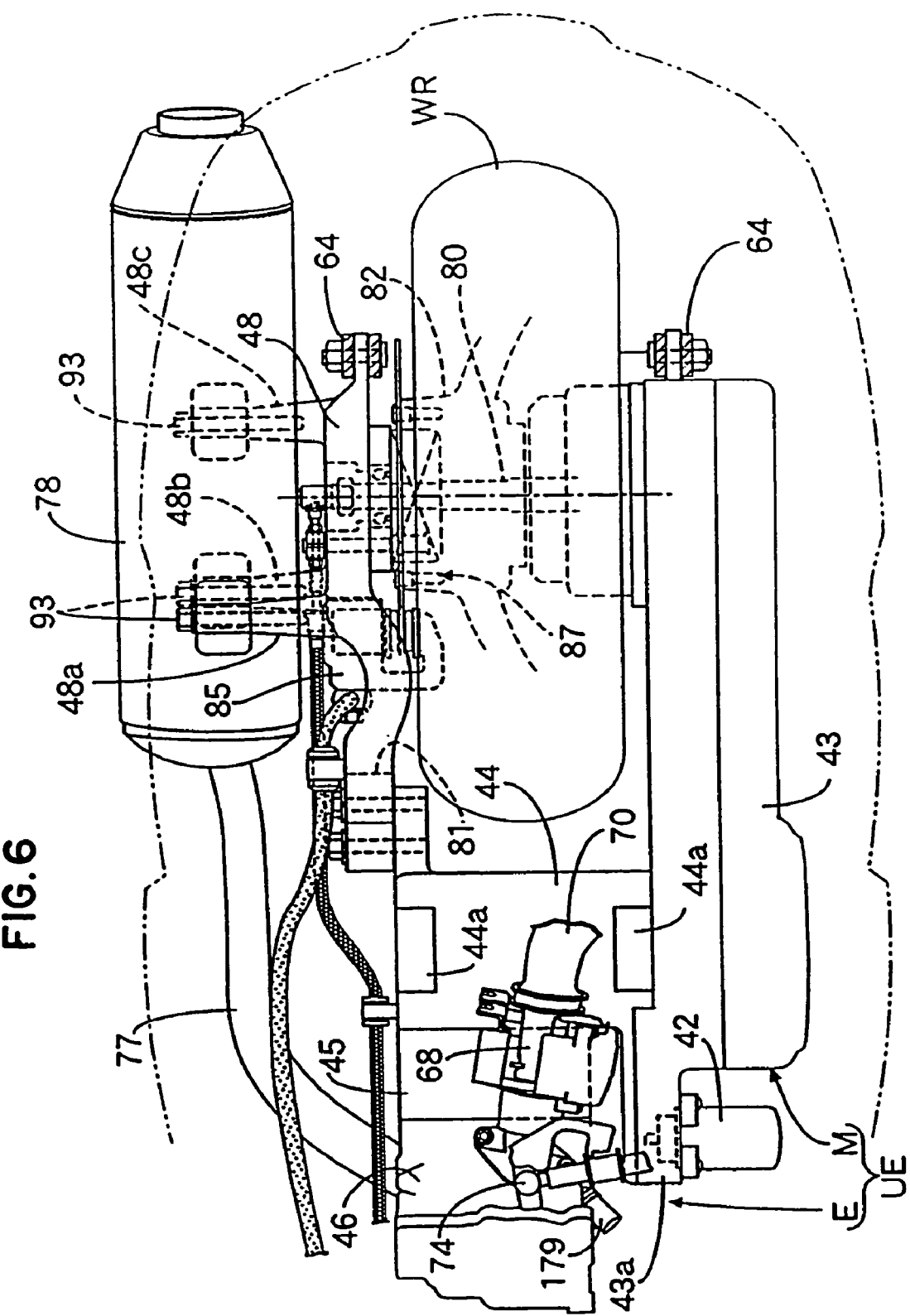
FIG. 6 is a view showing the relative arrangements of a unit swing engine and a rear wheel.

Referring to FIGS. 4 to 6 also, the unit swing engine UE is composed of a water-cooled type engine E having a cylinder axis set substantially horizontal, and a belt-type non-stage transmission M for transmitting the output of the engine E to the rear wheel WR through non-stage speed reduction via a transmission belt and pulleys, and the non-stage transmission M is for varying in a non-stage manner the speed change ratio by driving a movable pulley on the crankshaft side according to the operation of an electric motor 42 for speed change.

A transmission case 43 of the non-stage transmission M is in connection with the left side of a crankcase 44 of the engine E in such a manner as to be projected to the left side from the engine E, and is extended to the left side of the rear wheel WR. In addition, a front end portion of a swing arm 48 is connected to the right side of the crankcase 44, and the rear wheel WR is shaft-supported between a rear end portion of the transmission case 43 and a rear end portion of the swing arm 48.

Meanwhile, the electric motor 42 for speed change is disposed on the left side of a cylinder 45 in the engine E on the front side relative to the non-stage transmission M, and is attached to a front projected portion 43a of the transmission case 43, with its rotational axis directed in the vehicle width direction. In addition, the electric motor 42 is disposed on the lower side relative to a left-side passenger step 162 of a left-right pair of passenger steps 162 possessed by the vehicle body cover 34, and is disposed on the lower side (in side view) relative to the left-side support frame 41 of both the support frames 41 constituting a part of the vehicle body frames F.

Brackets 49, 49 are provided between the seat rails 39 and intermediate portions of the rear frames 40 in the vehicle body frames F, and a pair of support projection portions 44a, 44a are projected on the upper surface of the crankcase 44 in the engine E. A link 50 includes a link tube portion 50a extending in the vehicle width direction, and hollow cylindrical support tube portions 50b, 50b provided coaxially and integrally with both ends of the link tube portion 50a. Both the support projection portions 44a, 44a and the link tube portion 50a are connected to each other by a connection shaft 51 which is a bolt. In addition, the support tube portions 50b, 50b at both ends of the link 50 are turnably borne on the brackets 49, 49 through support shafts 52, 52 which are parallel to the connection shaft 51. Namely, the unit swing engine UE is borne on the vehicle body frame F so that it can be swung about the axis of both the support shafts 52, 52.

Meanwhile, a tension rod 53 is provided between the engine E and the vehicle body frame F, and ring-form connection portions 53a, 53b are provided at both ends of the tension rod 53. The connection portion 53a at one end of the tension rod 53 is turnably connected to a mount portion 54 which is provided at the seat rail 39 and the rear frame 40 on the right side in the vehicle body frame F, and the connection portion 53b at the other end of the tension rod 53 is turnably connected to the right end of the connection shaft 51 for connecting the crankcase 44 to the link 50.

The mount portion 54 includes a support tube 55 extending rearwardly to the skewly rear side from a front portion of the right-side seat rail 39, a bracket 56 attached to the rear end of the support tube 55 in a roughly U shape opened to the rear side, and a connection tube 57 for connection between the rear frame 40 and the bracket 56 on the right side. The connection portion 53a at one end of the tension rod 53 is turnably borne on the mount portion 54 by a bolt 58 fixed to the vehicle body frame F in the manner of being passed through the bracket 56 and the connection tube 57.

In addition, downwardly drooping support plates 61, 61 are attached to the rear ends of both the seat rails 39 in the vehicle body frame F, upper end portions of rear cushions 64, 64 are connected to a pair of brackets 63, 63 provided on a support pipe 62 bridgingly disposed between both the support plates 61, 61, and lower end portions of both the rear cushions 64, 64 are connected to a rear end portion of the transmission case 43 and a rear end portion of the swing arm 48.

Brackets 65 are attached to the rear ends, or lower ends, of both the upper down frames 37, and a main stand 66 is turnably supported on both the brackets 65. When the main stand 66 is erected, the motor scooter type vehicle can be set into a self-standing state, with the rear wheel WR floated above the ground, as shown in FIG. 1. At the time of running of the motor scooter type vehicle, it suffices to stow the main stand 66 in such a manner that the rear wheel WR is grounded.

The downstream end of a throttle body 68 is connected to the upper surface of a cylinder head 46 in the engine E, though an intake pipe 67 curved toward the rear side from the cylinder head 46, and the upstream end of the throttle body 68 is connected to an air cleaner 69 disposed on the upper side of the non-stage transmission M in the unit swing engine UE, through a connection pipe 70 passing on the upper side of the link tube portion 50a of the link 50.

A fuel injection valve 74 is attached to the intake pipe 67. In addition, a control box 76 containing therein a controller 75 for controlling the ignition timing of the engine E and the fuel injection amount of the fuel injection valve 74 is attached to the throttle body 68.

Figure 7:
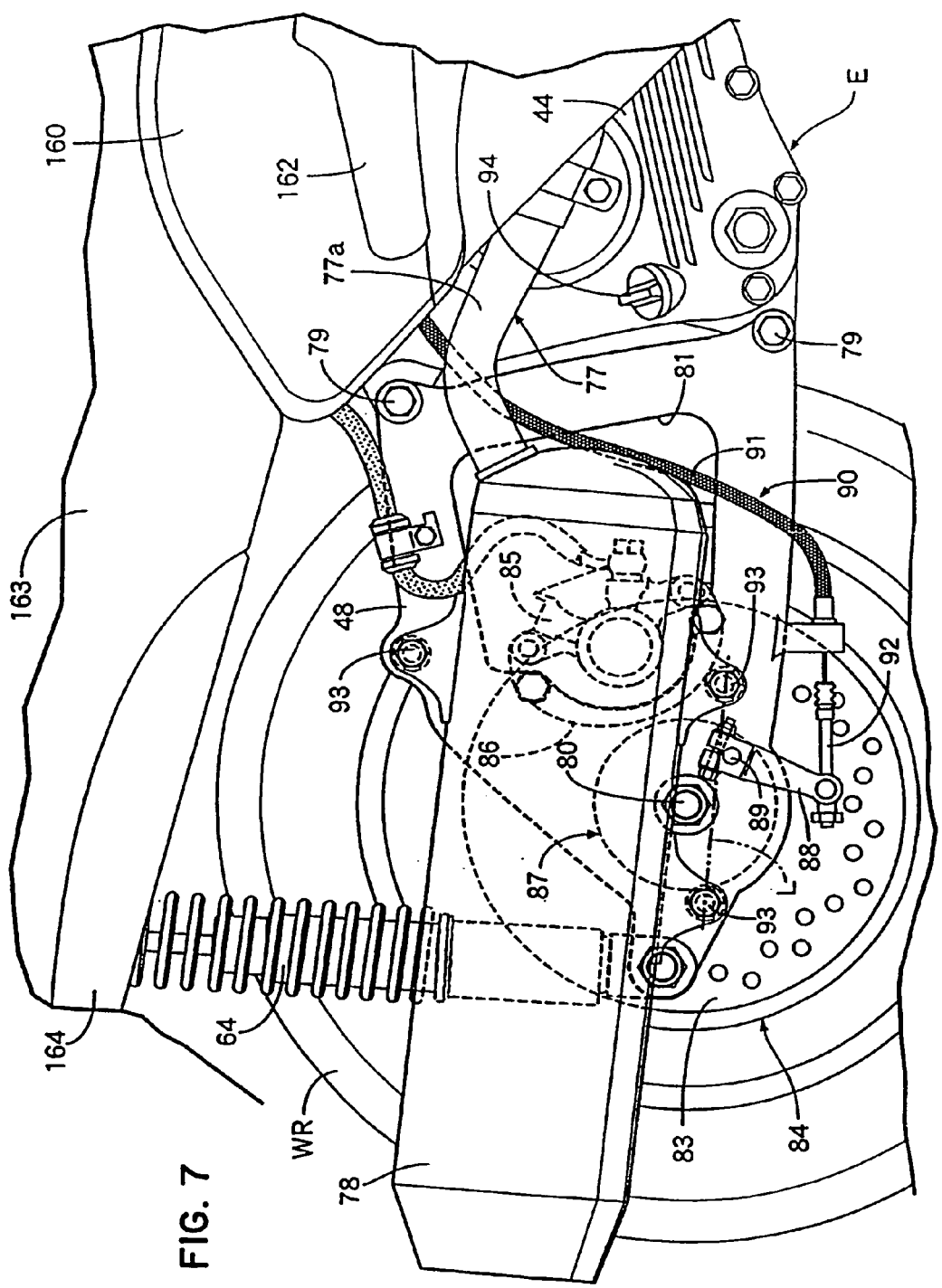
FIG. 7 is a right side view of a rear portion of the motor scooter type vehicle.

An exhaust pipe 77 is connected to a lower surface of the cylinder head, and the exhaust pipe 77 is connected to an exhaust muffler 78 disposed on the right side of the swing arm 48, as shown in FIG. 7.

Meanwhile, the swing arm 48 is so formed that, in side view, it is in a roughly triangular shape narrower on the rear end side. Upper and lower two portions of a front portion of the swing arm 48 are fastened to the crankcase 44 of the engine E by bolts 79, 79, an axle 80 of the rear wheel WR is borne on a rear portion of the swing arm 48, and the lower end of the rear cushion 64 is connected to the rear end of the swing arm 48 on the rear side relative to the axle 80.

The swing arm 48 is provided in its roughly central portion with an opening portion 81, and a brake caliper 85 of a rear brake 84, which is a disk brake including a brake disk 83 attached to a hub 82 of the rear wheel WR, is disposed in the opening portion 81. A caliper bracket 86 is attached to the swing arm 48, and the brake caliper 85 is fixed to the caliper bracket 86.

Moreover, the opening portion 81 is so formed that its vertical width is gradually reduced in a rearward direction, and the brake caliper 85 disposed at a rear portion of the opening portion 81 is fixed to the caliper bracket 86 which is attached to the swing arm 48 on the rear side of the opening portion 81.

In addition, a drum brake 87 for a parking brake is mounted to the hub 82 of the rear wheel WR, a lever 88 for causing the drum brake 87 to perform a braking operation is disposed on the outer side of the swing arm 48, and a turning shaft 89 to which the base end of the lever 88 is attached penetrates turnably through the swing arm 48 to project into the drum brake 87. On the other hand, an end portion of an outer cable 91 possessed by a brake cable 90 is supported on a lower portion of the swing arm 48, and an end portion of an inner cable 92 protruding from an end portion of the outer cable 91 is connected to a tip end portion of the lever 88.

Three support bosses 48a, 48b, 48c are integrally projected on the swing arm 48 so as to project to the outer side, and the exhaust muffler 78 fastened to the support bosses 48a to 48c by bolts 93 is disposed on the outer side of the swing arm 48 so as to cover, from the outer side, the brake caliper 85 disposed in the opening portion 81. Moreover, the brake caliper 85 is disposed between the support bosses 48a and 48b of the support bosses 48a to 48c, and the brake caliper 85 can be protected by the support bosses 48a, 48b.

In addition, lower portions of the exhaust muffler 78 are disposed on both the front and rear sides of the axle 80 of the rear wheel WR on the lower side relative to the exhaust muffler 78, of the support bosses 48a to 48c. Specifically, the lower portions of the exhaust muffler 78 are fastened to the swing arm 48 at two locations on both the front and rear sides of the axle 89, and the axle 89 and the fastening portion, for fastening to the swing arm 48, of the rear cushion 64 are disposed between a straight line L connecting between the two fastening portions and the exhaust muffler 78.

Meanwhile, a level gage 94 disposed at a lower portion of the crankcase 44 of the engine E so as to detect the oil level in the crankcase 44 is disposed in the vicinity of a connection portion of the exhaust pipe 77 for connection to the exhaust muffler 78. In the vicinity of the connection portion for connection to the exhaust muffler 78, the exhaust pipe 77 is provided with a curved portion 77a curved to be projected to the upper side, for obviating the interference thereof with the level gage 94.

The fuel injection valve 74 for injecting a fuel toward the engine E is supplied with the fuel from the fuel tank 28. The fuel tank 28 is disposed in a space which is surrounded by the left-right pair of upper down frames 37 and the left-right pair of lower down frames 38 of the vehicle body frame F and which is located immediately on the rear side of the front wheel WF, and is so formed as to extend vertically over the range from the rear side of a lower portion of the head pipe 27 to lower portions of both the lower down frames 38.

Mount plates 95 for fastening an upper portion of the fuel tank 28 are welded to the inclined portions 38a of both the lower down frames 38, and mount plates 96 for fastening a lower portion of the fuel tank 28 are welded to the horizontal portions 38b of both the lower down frames 38.

A pump unit 97 is contained in a lower portion of the inside of the fuel tank 28. The pump unit 97 is attached to the fuel tank 28 from the back side of the fuel tank 28 in the manner of being inserted into the fuel tank 28 via a mount hole 98 provided in the back surface of the lower portion of the fuel tank 28.

Moreover, the pump unit 97 is attached to the fuel tank 28 with its rotational axis inclined forwardly downwards, and a fuel filter 99 added to the pump unit 97 so as to suck in the fuel present in the fuel tank 28 is disposed at a lowermost portion of the inside of the fuel tank 28. In addition, a float 101 moved vertically according to the amount of fuel in the fuel tank 28 is extended from the pump unit 97, and a residual fuel amount detected by the float 101 is transmitted to the controller 75 in the control box 76 attached to the throttle body 68.

The radiator 29 having a radiator fan 35 is disposed at a position spaced rearwards from the fuel tank 28. The radiator 29 is supported by a support frame 100 which is provided between lower portions of the horizontal portions 38b in both the lower down frames 38 of the vehicle body frame F and rear portions of both upper down frames 37 in the vehicle body frame F.

A reservoir tank 104 communicated with the radiator 29 is disposed on the lower side of a right-side step floor 159 of a left-right pair of step floors 159 possessed by the vehicle body cover 34, a hose 105 communicated with the reservoir tank 104 is extended upwards, and the upper end of the hose 105 is connected to a water supply port forming member 108 for forming a water supply port 107 which can be opened and closed with a cap 106.

Moreover, the water supply port forming member 108 is supported on the mount portion 54, for mounting to the vehicle body frame F side, of the tension rod 53 provided between the vehicle body frame F and the unit swing engine UE swingably borne on the vehicle body frame F. Specifically, the water supply port forming member 108 is supported by the support tube 55 extending rearwardly downwards to the skew rear side from a front portion of the right-side seat rail 39 so as to constitute a part of the mount portion 54.

Figure 8:
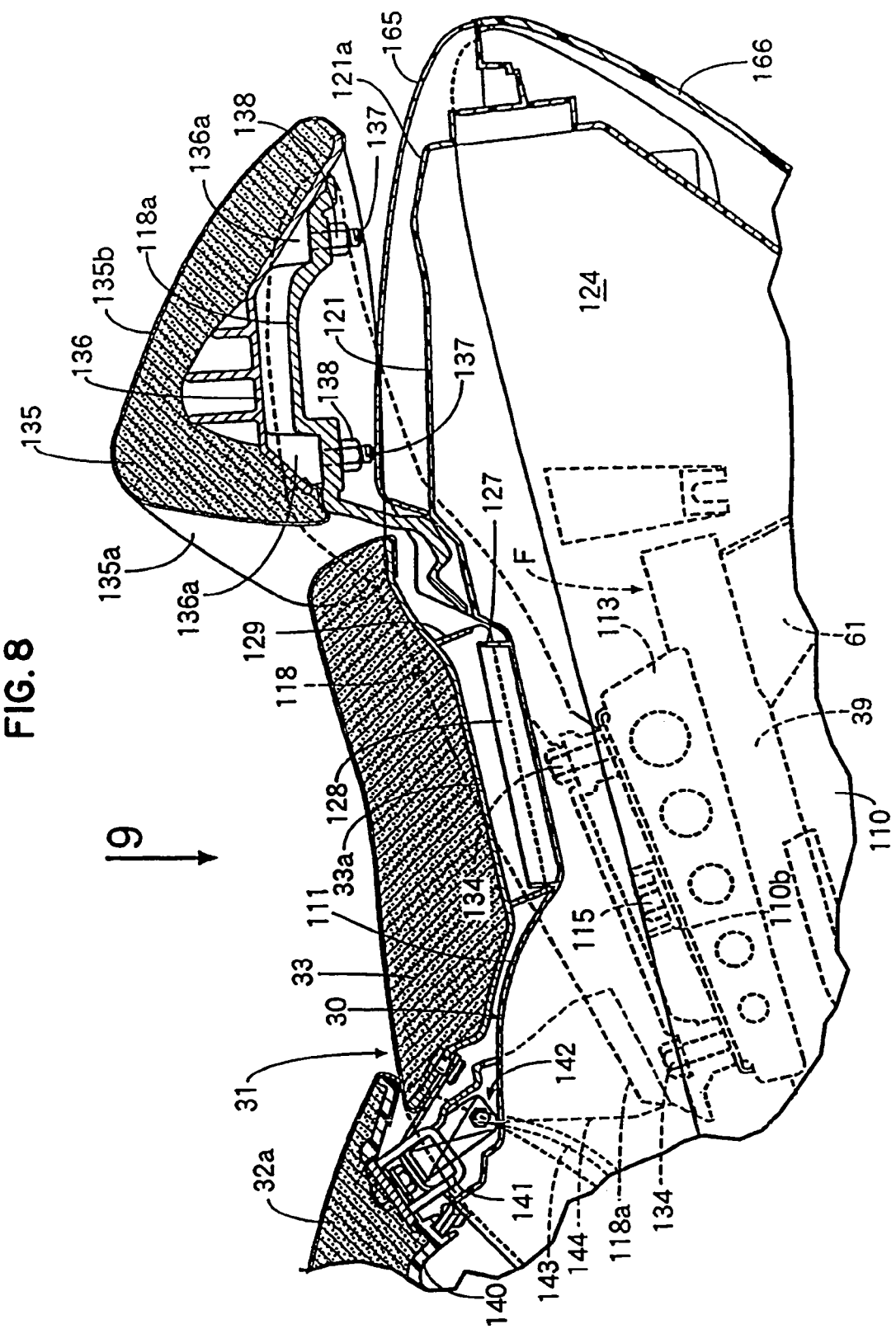
FIG. 8 is a vertical sectional view of the vicinity of a rear portion of the luggage box.
Figure 9:
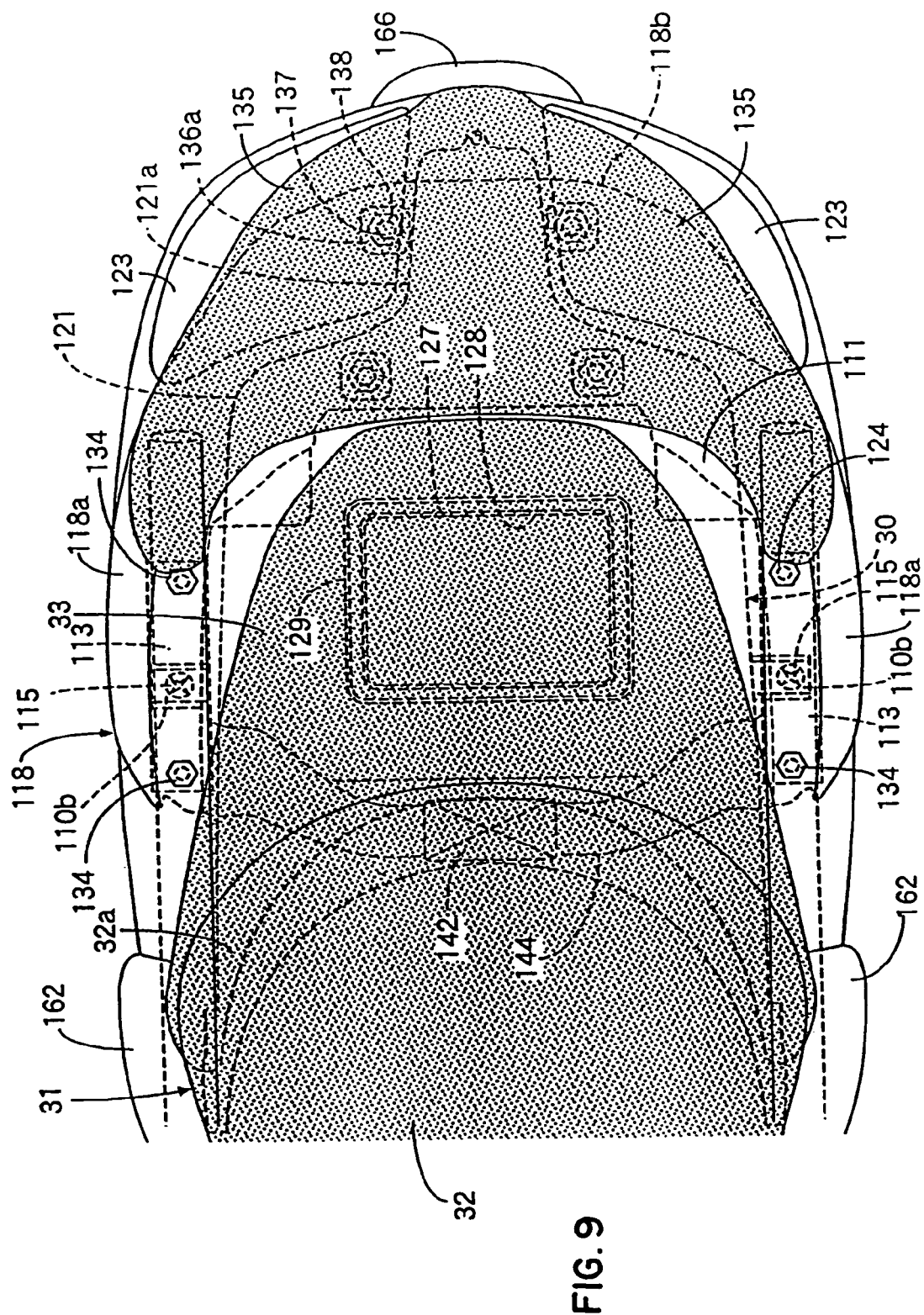
FIG. 9 is a view along arrow 9 of FIG. 8.

Referring to FIGS. 8 and 9 also, the luggage box 30 is disposed between rear portions of both the upper down frames 37, both the seat rails 39 and both the rear frames 40 in the vehicle body frame F. The luggage box 30 is composed of a box main body 110 opened at the upper end, and a top cover 111 connected to the box main body 110 so as to cover a rear portion of the box main body 110 from the upper side, and is disposed on the lower side of the rider's seat 31 so as to extend from the lower side of the front end of the rider's seat 31 to the vicinity of upper portions of the rear cushions 64.

For supporting the luggage box 30 on the vehicle body frame F, front support members 112 are welded respectively to intermediate portions of the pair of seat rails 39 in the vehicle body frame F, and rear support members 113 elongate in the front-rear direction are welded respectively to rear portions of both the seat rails 39. On the other hand, front mount portions 110a mounted on the front support members 112 and rear mount portions 110b mounted on intermediate portions in the longitudinal direction of the rear support members 113 are provided at upper portions on both sides of the box main body 110 of the luggage box 30, the front mount portions 110a are fastened respectively to the front support members 112 by bolts 114, and the rear mount portions 110b are fastened respectively to the rear support members 113 by bolts 115.

A bottom wall of the luggage box 30, namely, a bottom wall of the box main body 110 is provided with a front helmet containing portion 119 disposed on the lower side of the front seat 32 so as to be capable of containing a helmet H1 therein, a rear helmet containing portion 120 disposed on the lower side of the rear seat 33 so as to be capable of containing a helmet H2 therein, and a substantially flat shallow bottom portion 10c disposed between the front helmet containing portion 119 and the rear helmet containing portion 120, and the front and rear helmet containing portions 119, 120 are formed in the shape of being bulged downwards. In addition, the front edge of a top cover 111 in the luggage box 30 is formed in an arcuate shape bulged rearwards in top plan view, for making it possible to contain the helmet H2 into the rear helmet containing portion 120. Besides, an illuminating means 116 for illuminating the inside of the luggage box 30 is attached to the inside surface of the box main body 110 at a portion corresponding to a front portion of the top cover 111.

The throttle body 68 and the fuel injection valve 74 are disposed on the lower side of the shallow bottom portion 110c in the luggage box 30, with their upper end positions being nearly equal, and the water supply port 107 of the reservoir tank 104 is disposed there; besides, a first maintenance lid 117 is openably and closably attached to the shallow bottom portion 10c on the upper side of the water supply port 107.

The support pipe 62 which is a mount portion for mounting upper portions of the rear cushions 64 to a rear portion of the vehicle body frame F and a rear bulged portion 121 bulged rearwards beyond the rear end of the rear seat 33 are provided at a rear portion of the luggage box 30, and the rear bulged portion 121 is bulged rearwards to substantially the same position as that of the rear end of a grab rail 118 disposed around the rear seat 33. Moreover, a small width portion 121a to be fitted between left and right tail light units 123, 123 in top plan view is provided at a rear central portion of the rear bulged portion 121.

A lower portion of the rear bulged portion 121 is disposed on the lower side relative to the support pipe 62 which is a mount portion for mounting upper portions of the rear cushions 64 onto a rear portion of the vehicle body frame F, whereby a raised portion 110d corresponding to the mount portion for mounting the upper portions of the rear cushions 64 onto the vehicle body frame F is formed by partially raising the bottom wall of the luggage box 30, i.e., of the box main body 110, and an article containing portion 124 with the raised portion 110d intermediately provided between itself and the rear helmet containing portion 120 is formed inside the rear bulged portion 121.

The rear seat 33 of the rider's seat 31 is so formed as to cover the front side of the top cover 111 of the luggage box 30, and the front edge of the rear seat 33 is formed in an arcuate shape bulged rearwards in top plan view, correspondingly to the front edge of the top cover 111.

Figure 10:
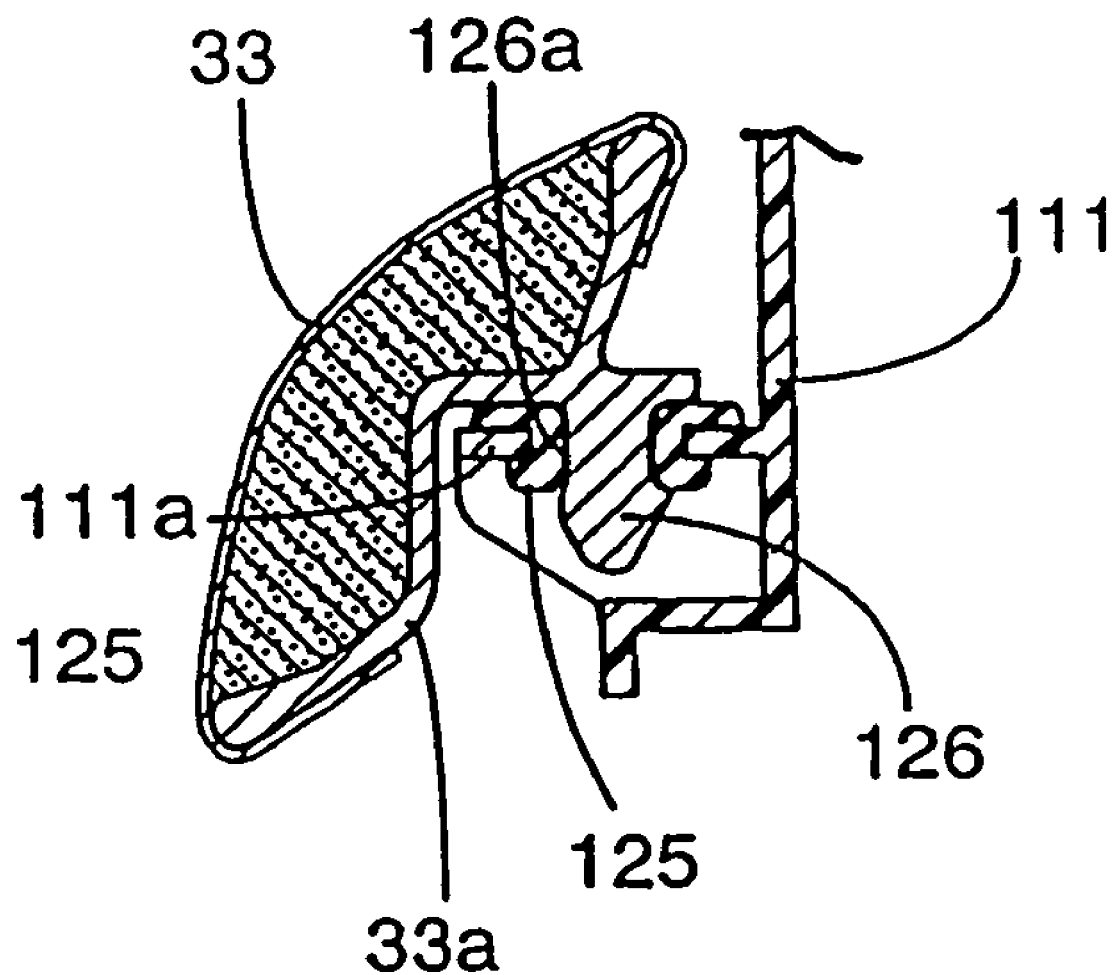
FIG. 10 is an enlarged sectional view along line 10—10 of FIG. 1.

In FIG. 10, the rear seat 33 is detachably attached to the top cover 111 of the luggage box 30, receiving plate portions 11a projecting sideways are integrally provided on both sides of a front portion of the top cover 111, and elastic rings 125 formed of an elastic material are mounted respectively to the receiving plate portions 11a. On the other hand, fitting projections 126 provided at the outer circumference thereof with annular recessed portions 126a for elastic engagement with the elastic rings 125 are integrally projected on a bottom plate 33a of the rear seat 33. By the elastic engagement between the fitting projections 126 with the elastic rings 125 through the annular recessed portions 126a, the rear seat 33 is detachably attached to the top cover 111.

A first rib 127 in an endlessly connected tetragonal shape is projected on the top face of the top cover 111, and a containing space 128 utilizable according to the attachment and detachment of the rear seat 33 is provided on the top face of the top cover 111 in the manner of being surrounded by the first rib 127. In addition, an endlessly connected second rib 129 is extended downwards from the bottom plate 33a of the rear seat 33 in the manner of surrounding the first rib 127, and a labyrinth structure surrounding the containing space 128 is constituted of the first and second ribs 127, 129.

The grab rail 118 is made of a metal, and integrally includes grip portions 118a, 118a disposed on both sides of the rear seat 33 and extended in the front-rear direction, and a connection portion for connection between the rear ends of the grip portions 118a. Front portions of both the grip portions 118a are fastened to rear support members 113 welded to rear portions of the seat rails 39 in the vehicle body frame F, by bolts 134 at two locations on the front and rear sides of the fastening portion for fastening the luggage box 30 to the rear support members 113, respectively.

The connection portion 118b is disposed at a position spaced upwards from an upper portion of the rear bulged portion 121 of the luggage box 30, and is integrally connected to the rear ends of both the grip portions 118a so as to be nearly equal in height to the top face of the rear seat 33. A back rest 135 for holding a waist portion of the passenger seated on the rear seat 33 from the rear side is detachably attached to the connection portion 118b.

Specifically, a plurality of leg portions 136a making contact with the connection portion 118b of the grab rail 118 are integrally projected on a bottom plate 136 of the back rest 135. In addition, bolts 137 passed through the connection portion 118b of the grab rail 118 are planted in the leg portions 136a, and, by bringing nuts 138 engaged with the lower surface of the connection portion 118b into screw engagement with the bolts 137 and fastening the nuts 138, the back rest 135 is detachably attached to the upper surface of a rear portion of the grab rail 118, i.e., the upper surface of the connection portion 118b.

Moreover, the back rest 135 is formed in a roughly streamline shape having, at its upper surface, a front inclined surface 135a inclined forwardly downwards and a rear inclined surface 135b inclined rearwardly downwards in side view, and is so formed as to be gradually reduced in width in the rearward direction in top plan view, and the grab rail 118 and the back rest 135 overlap each other over a substantially entire part thereof in top plan view.

The front seat 32 of the rider's seat 31 is integrally provided at its rear portion with a back rest portion 32a raised upwards so as to hold a waist portion of the driver seated on the front seat 32 from the rear side, and is disposed on the luggage box 30 so as to cover from the upper side a front opening portion, not covered by the top cover 111, of the luggage box 30. A front end portion of the front seat 32 is connected to the front end of the luggage box 30 through a pin hinge 139. Namely, the front end portion of the front seat 32 is borne on the luggage box 30 so that it can be opened and closed vertically.

A roughly U-shaped striker 141 is attached to a rear portion of the bottom plate 140 of the front seat 32, and a seat catcher 142 capable of changing over between a seat catch condition of holding the striker 141 and maintaining the front seat 32 in a closed state and a seat catch release condition of releasing the grip on the striker 141 and enabling opening and closing operations of the front seat 32 is disposed between front portions of the front and rear seats 32, 33 of the top cover 111 in the luggage box 30 at a position corresponding to a central portion in the width direction of the rear seat 33. The seat catcher 142 is set into the seat catch condition by engaging with the striker 141 when the upwardly opened front seat 32 is lowered to close the front opening portion of the luggage box 30, and is changed over from the seat catch condition to the seat catch release condition by a traction operation of a power transmission cable 143.

The seat catcher 142 is provided on a metallic bridging plate 144 disposed between the front ends of both the grip portions 118a of the grab rail 118, and the bridging plate 144 is so formed as to extend from the front ends of both the grip portions 118a into the area between the top cover 111 and the rear seat 33 and to extend along the upper surface of a front portion of the top cover 111.

In addition, a cover 146 having a cutout 145 (see FIG. 12) for removably inserting the striker 141 therein is attached to a front portion of the center in the width direction of the rear seat 33 so as to cover the seat catcher 142 from the upper side in the open condition of the seat 32.

Figure 11:
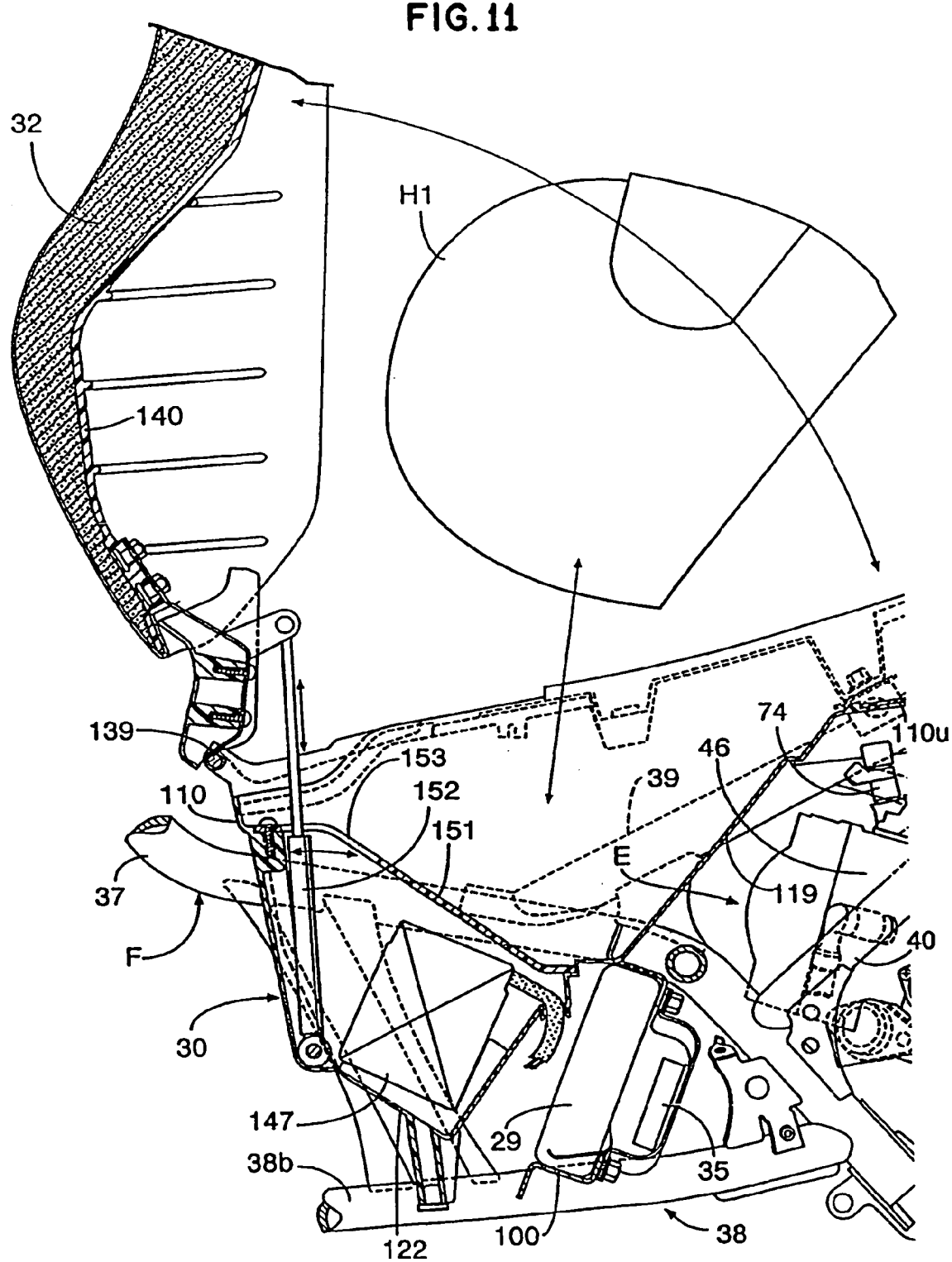
FIG. 11 is an enlarged view of an essential part of FIG. 5 in the condition where a front seat is opened.
Figure 12:
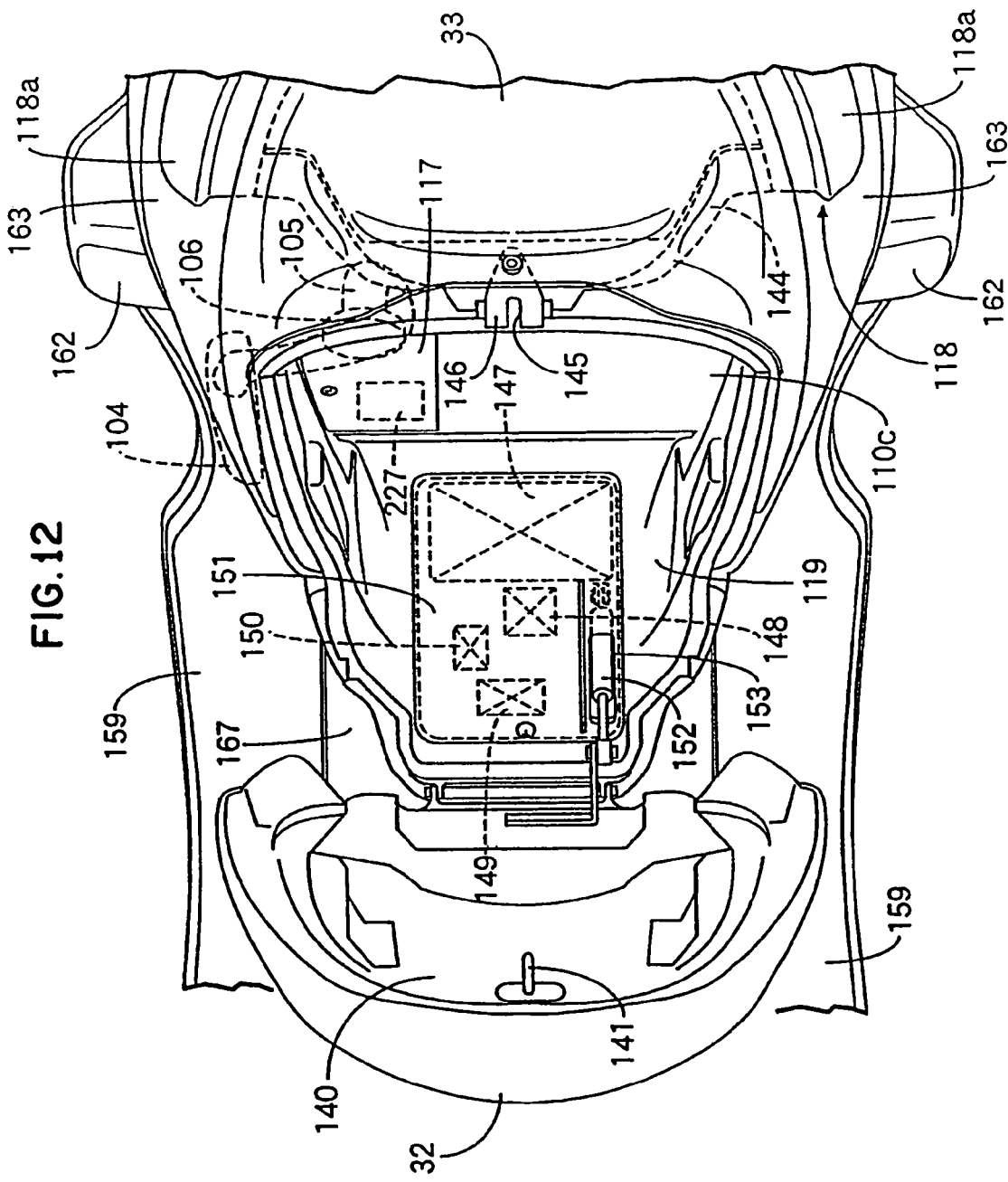
FIG. 12 is a view along arrow 12 of FIG. 11.
Figure 13:
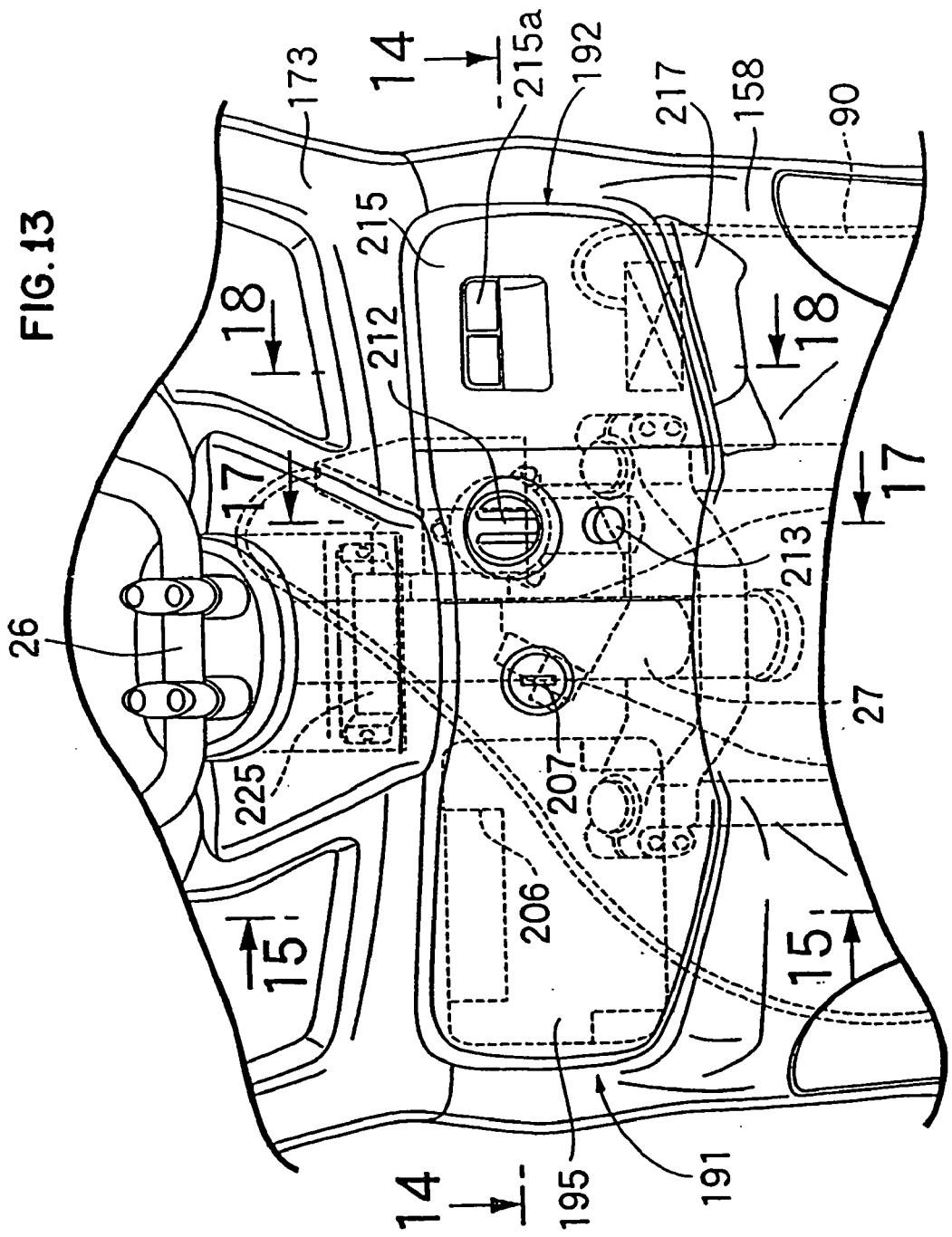
FIG. 13 is an enlarged view along arrow 13 of FIG. 1.
Figure 14:
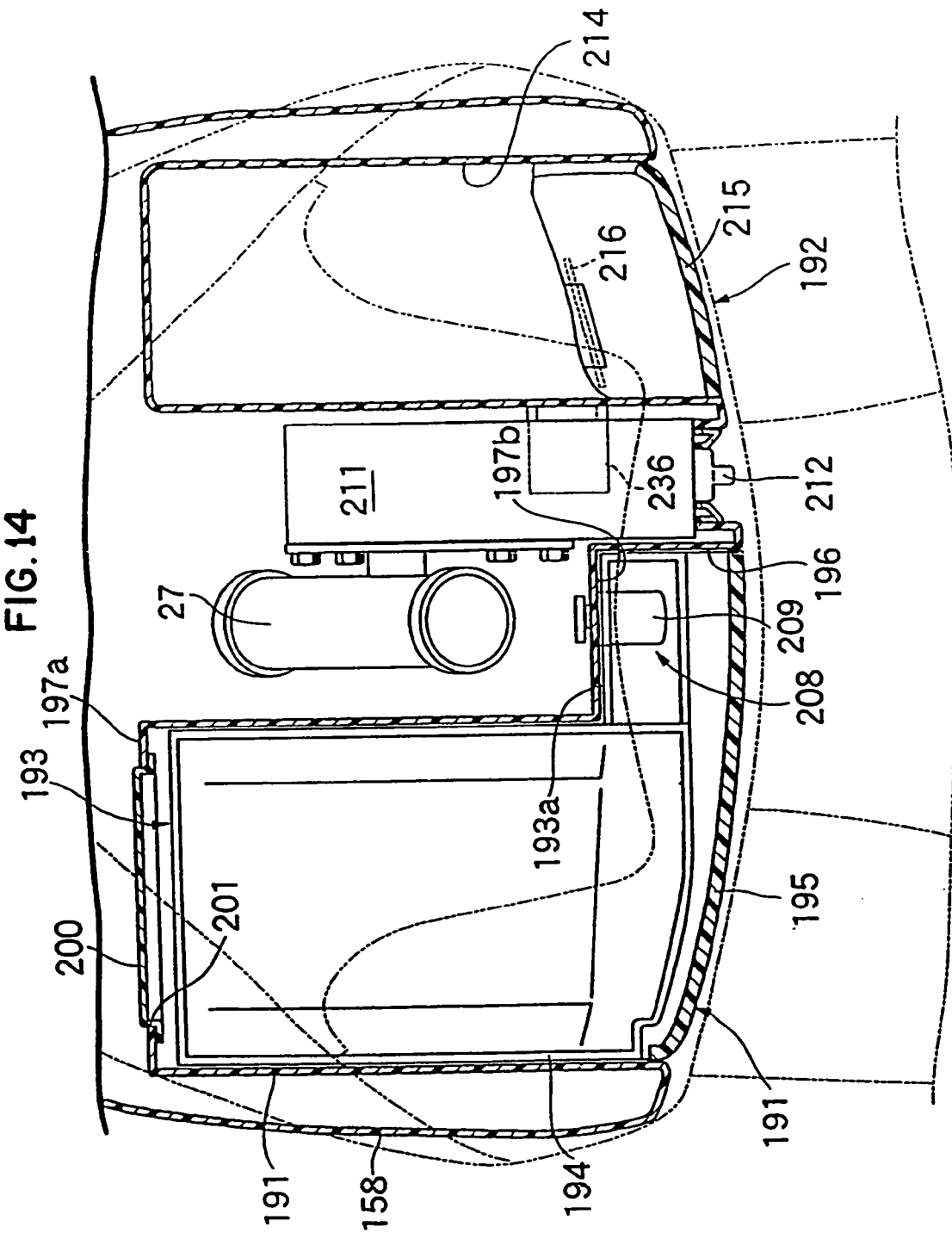
FIG. 14 is a general sectional view along line 14—14 of FIG. 13.
Figure 15:
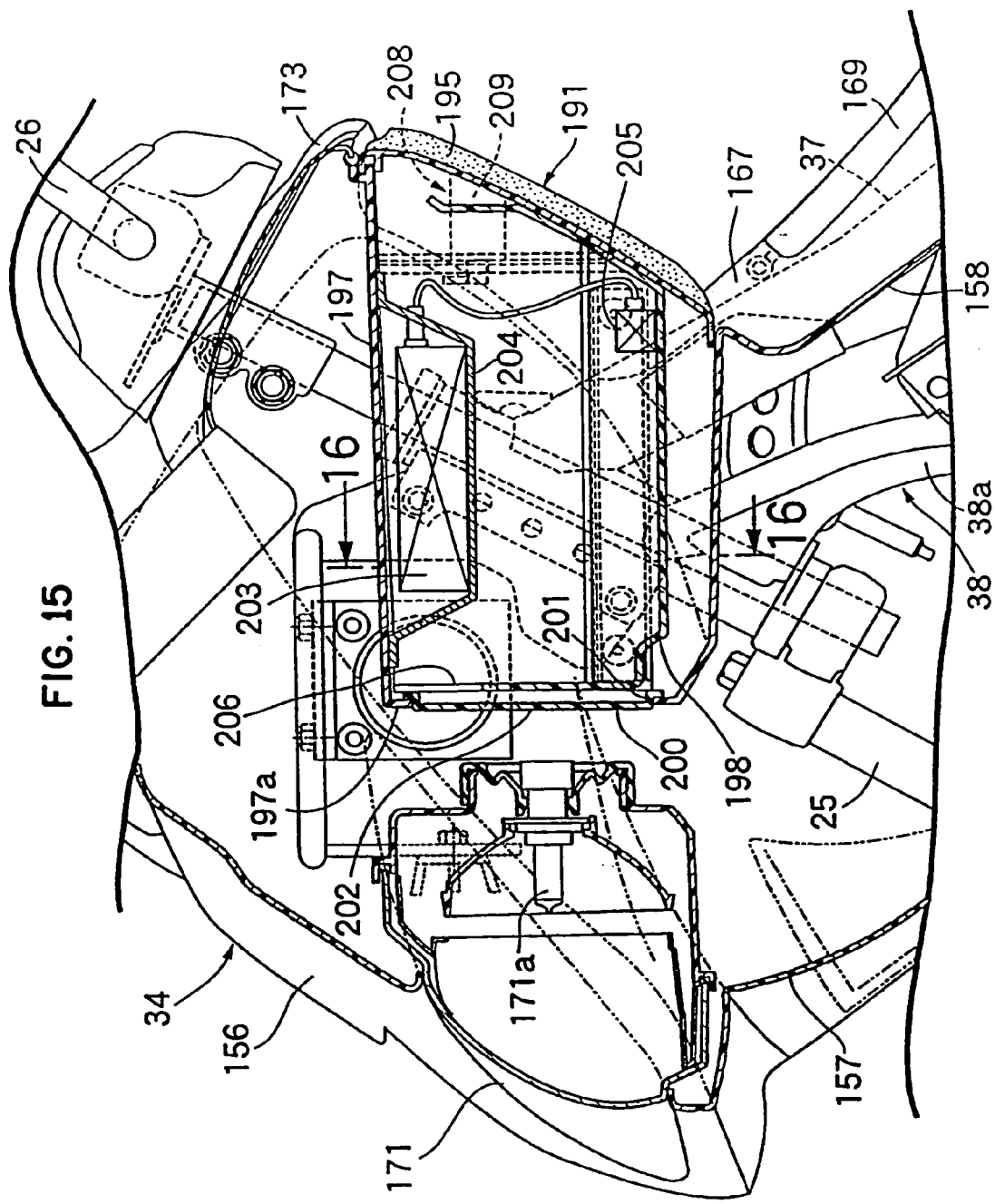
FIG. 15 is a sectional view along line 15—15 of FIG. 13.
Figure 16:
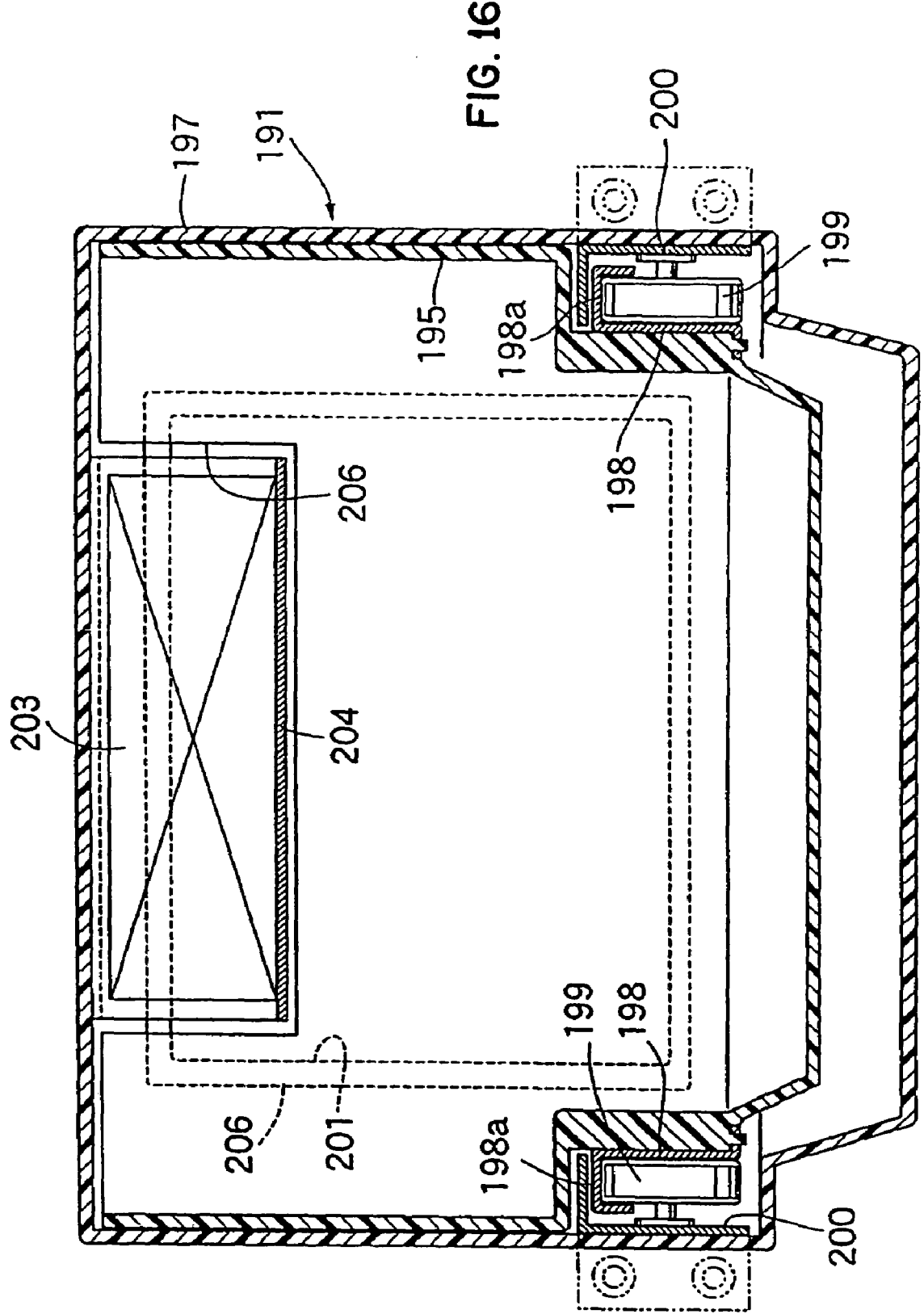
FIG. 16 is a sectional view along line 16—16 of FIG. 15.

Referring to FIGS. 11 and 12 also, the fuel tank 28 is disposed on the front side of the luggage box 30, a front bulged portion 122 bulged forwards to the vicinity of a bottom portion of the fuel tank 28 is disposed at a lower portion of the front end of the luggage box 30 so as to be disposed between the fuel tank 28 and the radiator 29, and a battery 147 which is an electrical equipment is contained in the front bulged portion 122. Namely, the battery 147 is disposed between the fuel tank 28 and the radiator 29.

Besides, electrical equipments 148, 149, 150 and the like are contained in the front bulged portion 122, in addition to the battery 147.

A second maintenance lid 151 for partitioning between the front bulged portion 122 and the front helmet containing portion 119 is openably and closably attached to the bottom wall of the box main body 110 of the luggage box 30, and, by opening the second maintenance lid 151 in the condition where the front seat 32 is opened, it is possible to perform maintenance of the battery 147 and the electrical equipments 148 to 150 in the front bulged portion 122.

In addition, a damper rod 152 for assisting the opening and closing operations of the front seat 32 by enabling the front seat 32 to be opened with a light force and moderating the closing speed at the time of closing the front seat 32 is provided between a front portion of the front seat 32 and a front portion of the luggage box 30. A lower portion of the damper rod 152 is contained in the front bulged portion 122, and the second maintenance lid 151 is provided with a slit 153 for passing the damper rod 152 therethrough so as to permit displacements of the damper rod 152 attendant on the opening and closing of the front seat 32.

Again in FIG. 1, the vehicle body cover 34 includes a front cover 156 for covering a front portion of the head pipe 27 and an upper portion of the front wheel WF, a left-right pair of front side covers 157 joined to both the left and right sides of the front cover 156, a leg shield 158 joined to both the front side covers 157 so as to cover the front side of leg portions of the rider seated on the front seat 32 and to cover the head pipe 27 from the rear side, a left-right pair of floor center covers 160 extending rearwards in continuity with the leg shield 158 and forming step floors 159 at lower end portions thereof, a left-right pair of floor side covers 161 drooping downwards respectively from outer edges of the step floors 159, a left-right passenger's steps 162 provided respectively at rear portions of the step floors 159, a left-right pair of body side covers 163 disposed on the lower side on both sides of the rider's seat 31 and extended rearwards in connection with the floor side covers 161, a left-right pair of rear floor covers 164 provided in continuity with rear lower portions of the body side covers 163, a rear upper cover 165 disposed between the rear bulged portion 121 of the luggage box 30 and the grab rail 118, and a rear center cover 166 disposed between the left-right pair of tail light units 123 and is in continuity with the rear upper cover 165 in the manner of covering the small width portion 121a of the rear bulged portion 121 of the luggage box 30.

By a part of the leg shield 158 and the left-right pair of floor center covers 160, a floor tunnel portion 167 is formed so as to be raised upwards between both the step floors 159 is disposed in the area ranging from the rear side of the head pipe 27 to the lower side of the front end of the rider's seat 31 and to be located on the upper side of the fuel tank 28 and the radiator 29. An oil supply lid 169 is openably and closably attached to the floor tunnel portion 167 to make it possible to supply an oil into the fuel tank 28 by opening an oil supply cap 168 provided at the upper end of the fuel tank 28. A hinge cover 170 for covering the hinge portion for hinging the front seat 32 to the luggage box 30 is joined to the rear end of the floor tunnel portion 167.

Head lights 171 are disposed respectively between both sides of a front portion of the front cover 156 and front portions of the left-right pair of front side covers 157, and winkers 172 are disposed respectively on the lower side of the head lights 171 and at front portions of both the front side covers 157. In addition, a panel 173 for disposing meters is joined to upper portions of the front cover 156, both the front side covers 157 and the leg shield 158, and a meter viser 173a is integrally provided at a front portion of the panel 173 in the manner of being raised upwards. Further, a windshield 174 is disposed on the front side of the meter viser 173a.

A front fender 175 for covering the front wheel WF from the upper side is supported by the front fork 25, and a left-right pair of rearview mirrors 176, an audio operating switch case 177, a switch case 178 for operating lights and the like, etc. are attached to the steering handle 26.

A plug maintenance lid 180 for performing maintenance of a spark plug 179 possessed by the engine E is openably and closably attached to the left-side floor center cover 160 of the left-right pair of floor center covers 160, at a position on the front side of the passenger's step 162.

A license plate 182, a reflector 183 and a license light 184 are attached to a rear fender 181 for covering the rear wheel WR from the rear side. The rear fender 181 is attached to the rear bulged portion 121 of the luggage box 30, together with the left-right pair of tail light units 123 and a rear upper cover 165 and a rear center cover 166 which are cover members constituting a part of the vehicle body cover 34.

In addition, a pair of ribs 110e functioning as rear fender are projected on the lower surface of the box main body 110 of the luggage box 30 on the front side of the rear fender 181, so as to be disposed on both the left and right sides of the rear wheel WR, as shown in FIG. 5.

In FIGS. 13 to 16, first and second article containing portions 191, 192 are disposed on the leg shield 158 in the state of being divided to the left and right sides, and the first article containing portion 191 is configured to be of a drawer type which has a containing case 193 capable of being removed by drawing out of the leg shield 158.

The containing case 193 includes a decorative cover 195 attached to the outer end of a case main body 194 formed, for example, from a synthetic resin in a rectangular box shape opened at an upper portion. In addition, the leg shield 158 is provided with a rectangular opening portion 196 for passing the containing case 193 in and out therethrough, a storage wall 197 formed in a rectangular tubular shape is integrally connected to the opening portion 196, and the inner end of the storage wall 197 is closed with an end wall 197a.

Movable rails 198, 198 extending in the front-rear direction are fixed respectively to lower portions on both sides of the case main body 194, and support portions 198a, 198a formed in a roughly U-shape opened to the lower side are formed integrally with the upper ends of the movable rails 198. On the other hand, fixed rails 200, 200 extending in the front-rear direction correspondingly to the movable rails 198 are fixed to both inside surfaces of the storage wall 197, and rollers 199, 199 for mounting the support portions 198a of the movable rails 198 thereon are shaft-supported respectively at a plurality of locations, for example, two locations spaced in the longitudinal direction of the fixed rails 200. This ensures that the containing case 193 is inserted via the opening portion 196 into the storage wall 197 in such a manner that the containing case 193 can be slid between a storage position where the decorative cover 195 of the containing case 193 is in continuity with and substantially flush with the back surface of the leg shield 158 and a drawn-out position where the containing case 193 is mostly drawn out of the storage wall 197; in addition, it is also possible to draw the entire part of the containing case 193 out of the leg shield 158. Moreover, the containing case 193 is so formed as to cover the head pipe 27 from the left side when in the storage position.

Meanwhile, an end wall 197a of the storage wall 197 is provided with a maintenance window 201 for enabling a maintenance operation such as replacement of a bulb 171a of the head light 171 located on the front side of the end wall 197a when the containing case 193 has been drawn out of the leg shield 158, and the window 201 is covered with a detachable lid 202.

A support frame 204 for mounting an audio amplifier 203 thereon is attached to the upper surface of the storage wall 197, and a connector 205 in continuity with the amplifier 203 can be connected to a portable sound source such as MP3, CD, MD players which is contained in the containing case 193. Moreover, in order to obviate the interference of the support frame 204 with the containing case 193 at the time of sliding the containing case 193 between the storage position and the drawn-out position, the case main body 194 of the containing case 193 is provided at its inner end with a cutout 206 corresponding to the support frame 204.

Incidentally, the amplifier 203 may be fixed in the containing case 193. In that case, the support frame 204 is needless, so that it is unnecessary to provide the case main body 194 with the cutout 206 at the inner end thereof.

The containing case 193 is provided on the outer end side thereof with a projected portion 193a projected inwards in the vehicle width direction, and the storage wall 197 is provided with a recessed portion 197b for storing the projected portion 193a when the containing case 193 is stored in the storage position, in the manner of being opposed to the head pipe 27 from the rear side.

A locking mechanism 208 capable of changeover between connection of the containing case 193 to the leg shield 158 and release of the connection according to a key operation from a key hole 207 fronting on the front surface of the containing case 193 is provided between the containing case 193 and the leg shield 158. The locking mechanism 208 has a structure in which a cylinder lock 209 operated by the key operations from the key hole 207 is provided at the projected portion 193a of the containing case 193 in such a manner as to change over between engagement with the recessed portion 197b of the storage wall 197 and disengagement. The locking mechanism 208 is disposed at a position opposed to the head pipe 27 from the rear side.

A handle lock module 211 for making steering operations of the steering handle 26 impossible is disposed on the opposite side of the first article containing portion 191 and in the vicinity of the head pipe 27, and the second article containing portion 192 is disposed, with the handle lock module 211 between itself and the first article containing portion 191.

Figure 17:
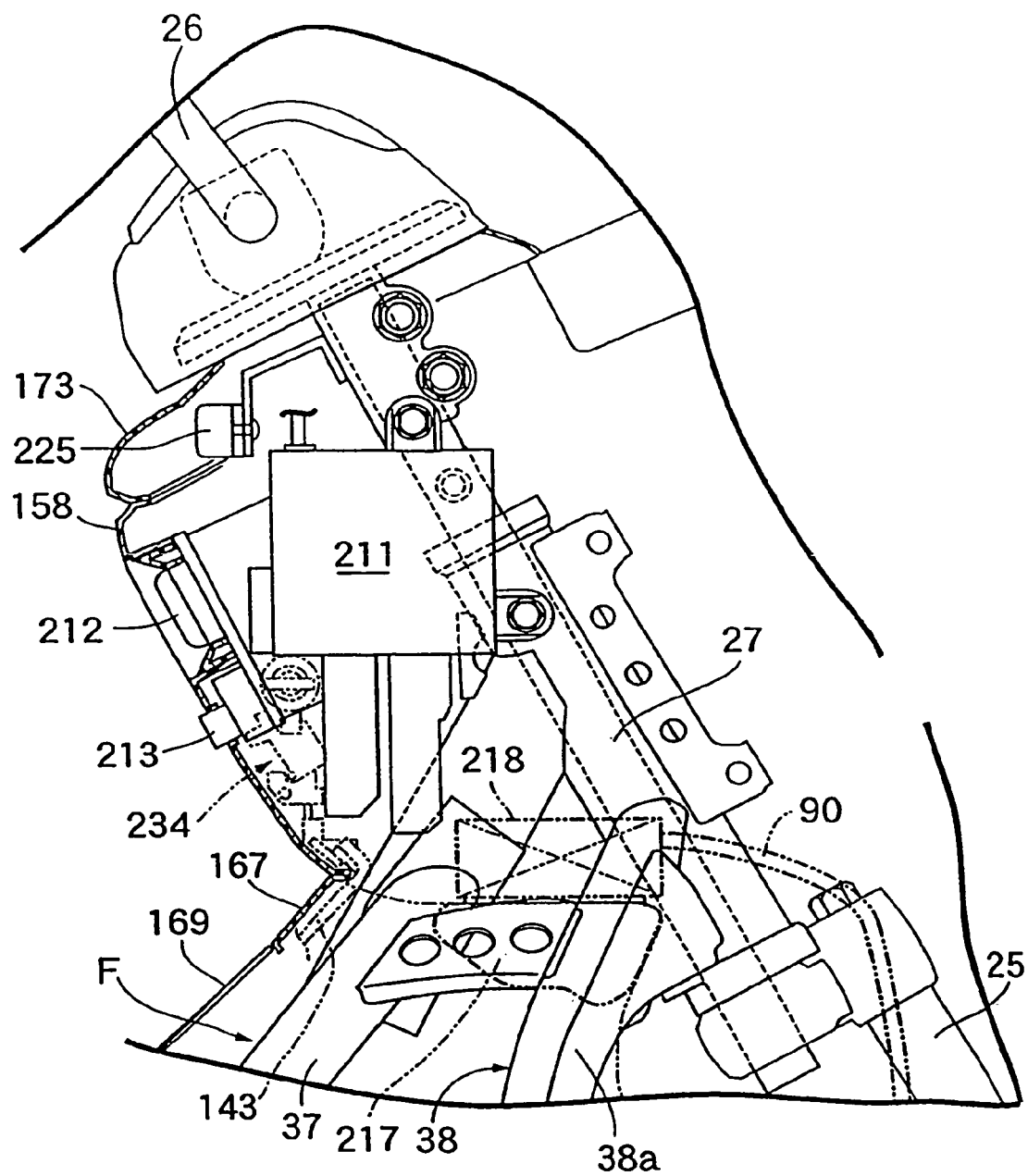
FIG. 17 is a sectional view along line 17—17 of FIG. 13.

In FIG. 17, the handle lock module 211 enables a steering operation of the steering handle 26 and enables starting of the engine E, attendant on an operation, under predetermined conditions, of a knob 212 fronting on the back side of the leg shield 158 between the first and second article containing portions 191 and 192. A seat unlocking switch 213 for enabling an opening operation of the front seat 32 of the rider's seat 31 by an operation under predetermined conditions is disposed on the lower side of the handle lock module 211 and on the back side of the leg shield 158.

Figure 18:
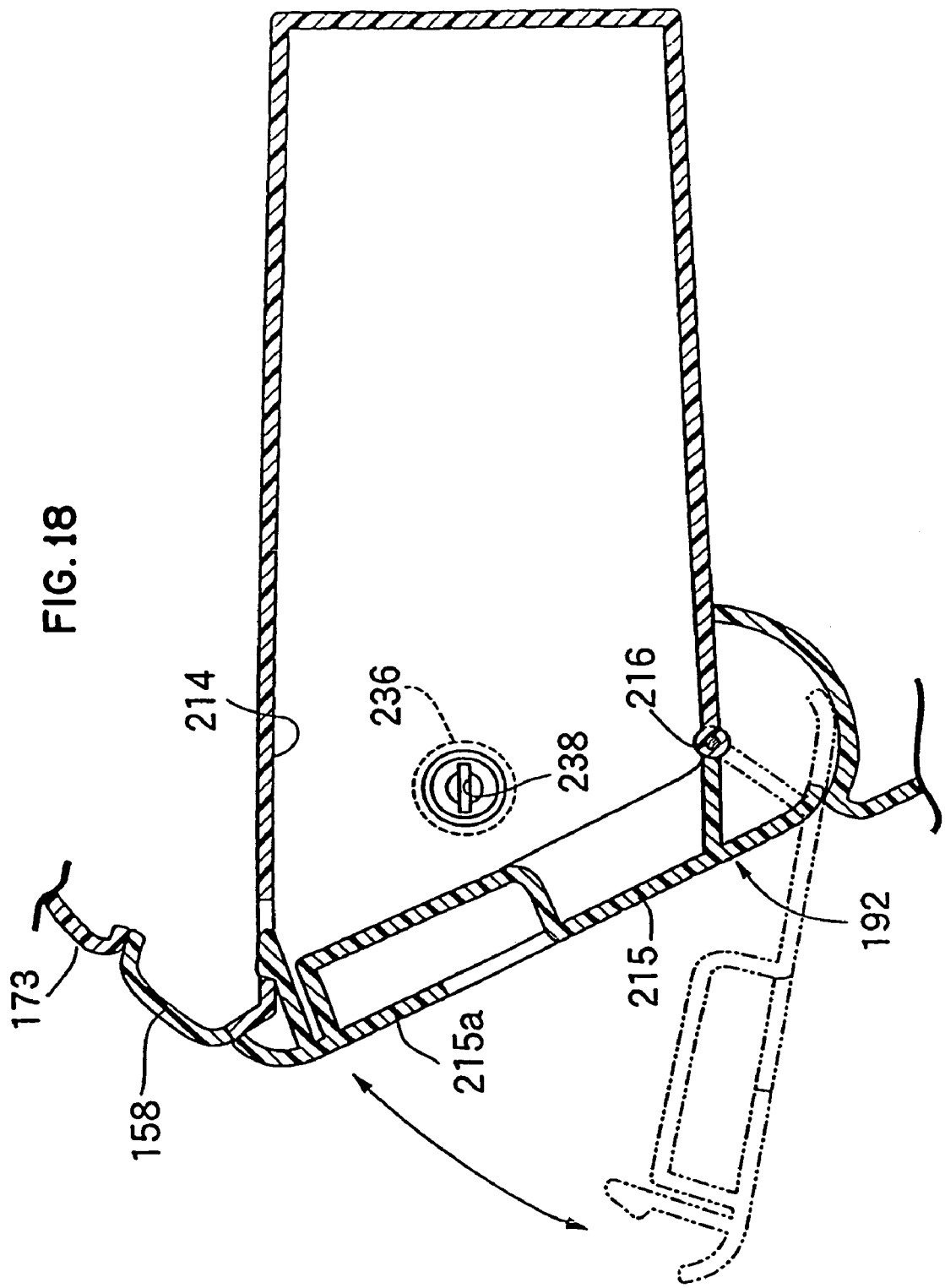
FIG. 18 is a sectional view along line 18—18 of FIG. 13.

In FIG. 18, the second article containing portion 192 has a structure in which a containing recessed portion 214 formed in the leg shield 158 is openably and closably covered with a lid member 215 hinged to the leg shield 158. The containing recessed portion 214 is formed to be smaller than a containing case 193 of the first article containing portion 191 and to be slightly narrowed as the front end is approached.

The lid member 215 is hinged to the leg shield 158 through a pivot shaft 216 so that it can be turned between an open position where it is turned downwards to open the containing recessed portion 214 as indicated by chain line in FIG. 18 and a closed position where it closes the containing recessed portion 214 as indicated by solid line in FIG. 18. The lid member 215 is integrally provided with a handle portion 215a for enabling turning operations.

In addition, a parking brake lever 217 for operating the brake cable 90 connected to the drum brake 87 of the rear wheel WR is turnably shaft-supported on the leg shield 158 on the lower side of the lid member 215, and the brake cable 90 is extended out from a parking brake mechanism 218 operated according to an operation of the parking brake lever 217.

Figure 19:
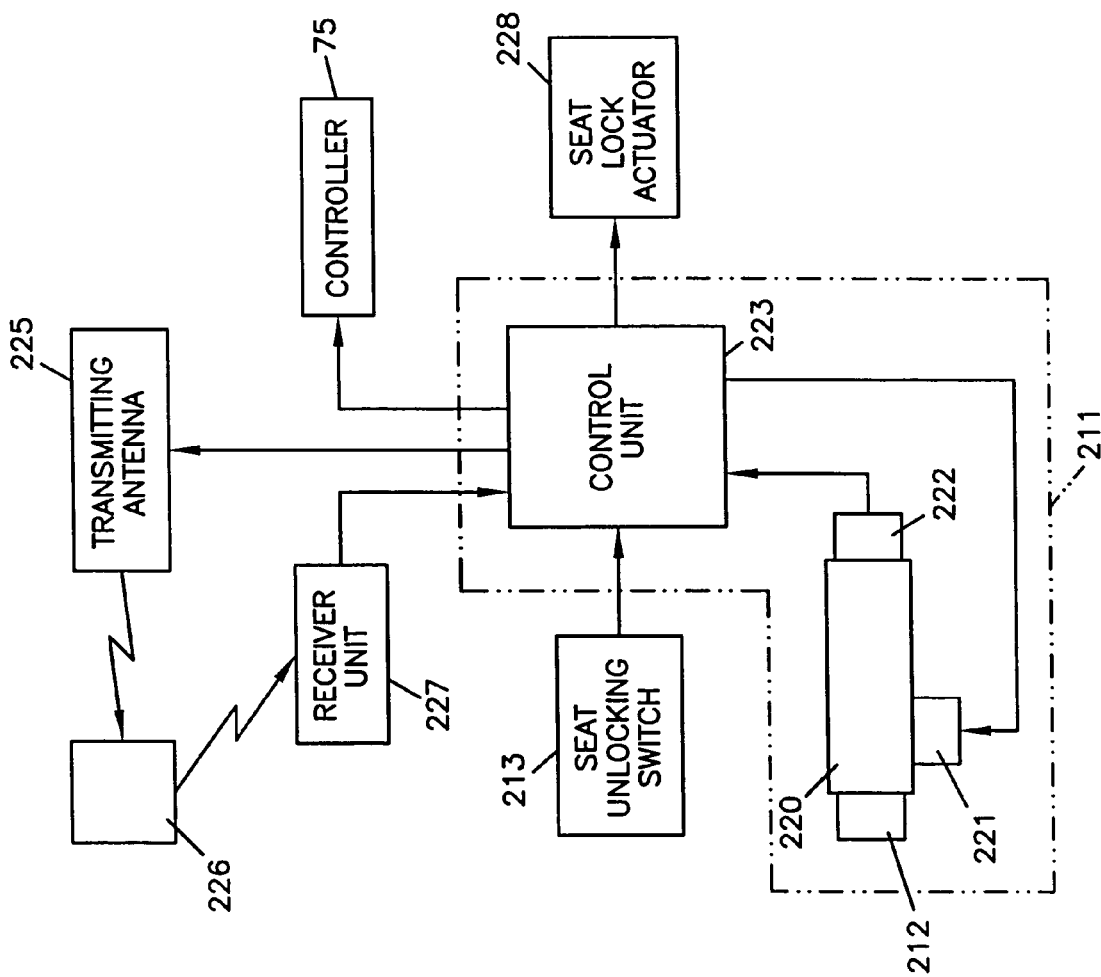
FIG. 19 is a diagram showing the configuration of a smart entry system.

In FIG. 19, the controller 75 contained in the control box 76 attached to the throttle body 68, the handle lock module 211 and the seat unlocking switch 213 constitute a part of a smart entry system. The handle lock module 211 includes a cylinder lock 220 which can be turned through a knob 212 and which release the locked state of the steering handle 26 onto the head pipe 27 at the time of a turning operation, a lock solenoid 221 capable of making the turning of the cylinder lock 22 impossible, a main switch 222 performing a switching operation according to the turning of the cylinder lock 220, and a control unit 223 supplied with a signal from the main switch 222, the lock solenoid 221 being controlled by the control unit 223.

The control unit 223 controls a transmission antenna 225 for transmitting a signal for prompting the transmission of an ID signal from a normal portable transmitter 226 carried by the vehicle user, and the result of signal reception by a reception unit 227 for receiving the signal from the portable transmitter 226 is inputted to the control unit 223. When it is confirmed that the ID signal transmitted from the portable transmitter 226 is a predetermined signal, the control unit 223 operates the lock solenoid 221 so as to permit a turning operation of the cylinder lock 220 through the knob 212.

In addition, when it is confirmed that the ID signal transmitted from the portable transmitter 226 is a predetermined signal, the control unit 223 operates a seat lock actuator 228 according to an operation of the seat unlocking switch 213, and enables an operation control on the engine E by the controller 75 according to the conduction of the main switch 222.

The reception unit 227 is disposed in the luggage box 30 or in the rider's seat 31. In this embodiment, the luggage box 30 is provided with a reception unit containing portion 101f formed by recessing downwards a part of a shallow bottom portion 110c of the luggage box 30, and the reception unit 227 is contained in the reception unit containing portion 101f. Moreover, a first maintenance lid 117 for performing maintenance concerned with the engine E disposed on the lower side of the luggage box 30 is openably and closably provided at the shallow bottom portion 110c, and the reception unit 227 is contained in the reception unit containing portion 101f so as to be covered with a part of the first maintenance lid 117.

Figure 20:
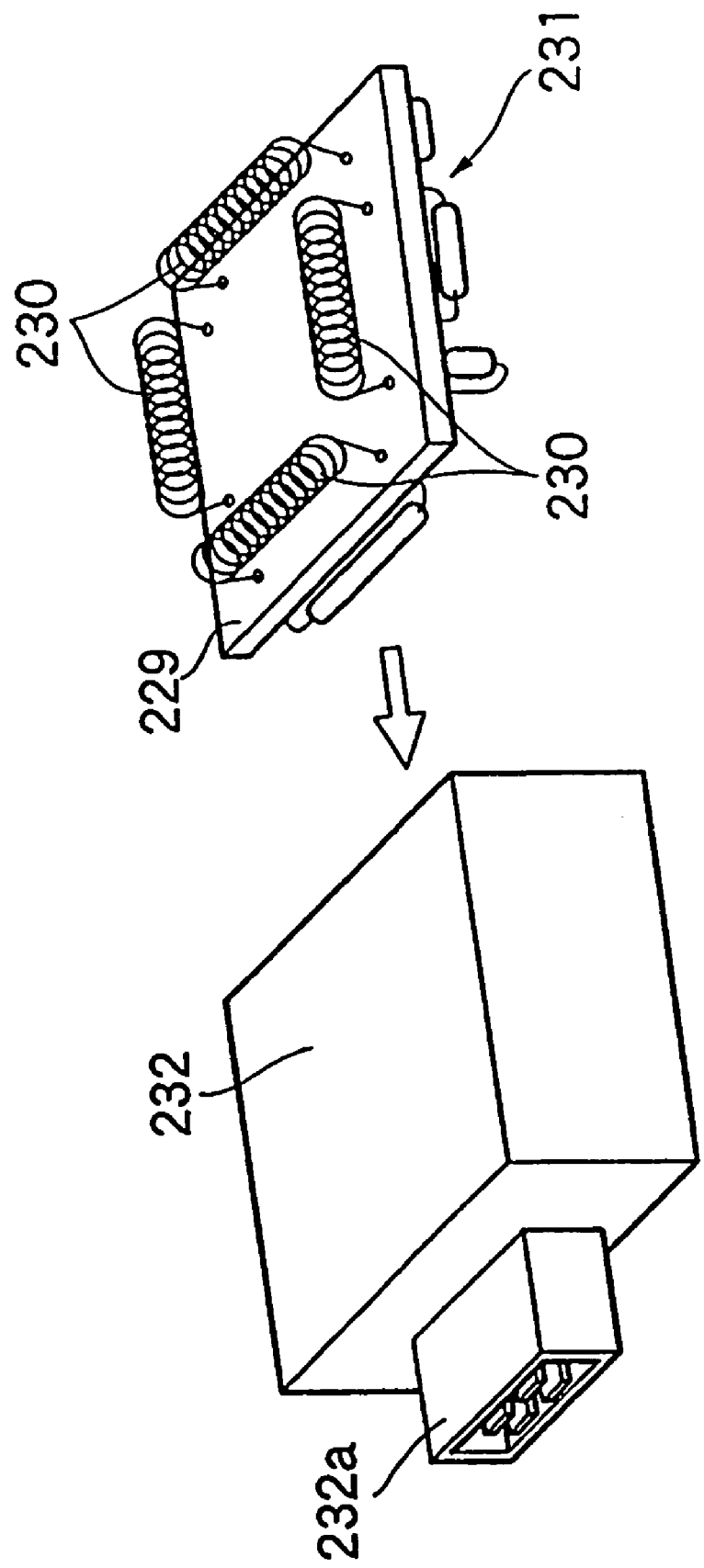
FIG. 20 is an exploded perspective view of a reception unit.

In FIG. 20, the reception unit 227 has a structure in which a substrate 229 provided with antennas 230, 230 on one side thereof and with a reception circuit 231 on the other side thereof is contained in a case 232 provided integrally with a coupler portion 232a.

On the other hand, a reception antenna 225 is disposed at a position spaced from the handle lock module 211; in this embodiment, the reception antenna 225 is disposed on the upper side of the handle lock module 211 on the center line in the vehicle width direction, for example, directly under the panel 173 constituting a part of the vehicle body cover 34.

In FIG. 21, the power transmission cable 143 in connection with the seat catcher 142 is connected to one end of a link 233 possessed by a link mechanism 234, and the seat lock actuator 228 is connected to the other end of the link 233 through a cable 235 so that an operation of the seat lock actuator 228 turns the link 233 so as to pull the power transmission cable 143.

A key hole 238 of an emergency unlocking key cylinder lock 236 disposed in the leg shield 158 so as to permit at least starting of the engine E and handle unlocking while unnecessitating the portable receiver 226 is arranged on the inside surface on the handle lock module 211 side of the containing recessed portion 214 in the second article containing portion 192.

The emergency unlocking key cylinder lock 236 includes a turning lever 236a turned by an operation of an emergency unlocking mechanical key inserted into the key hole 238, and the turning lever 236a is connected to the other end side of the link 233 through a cable 237.

When the emergency unlocking key cylinder lock 236 is operated for unlocking, the link 233 is turned so as to pull the power transmission cable 143. With either one of the operation of the seat lock actuator 228 and the unlocking operation of the emergency unlocking key cylinder lock 236, the link 233 is turned so as to pull the power transmission cable 143, whereby the seat catcher 142 is changed over from the seat catch condition to the seat catch release condition.

By opening the front seat 32 and operating a predetermined component part disposed in the luggage box 30 according as the seat catcher 142 is set into the seat catch release condition, the control unit 223 is set into a control mode similar to that upon the reception of the ID signal from the normal portable transmitter 226, resulting in that the motor scooter type vehicle can be steered.

Next, the functions of this embodiment will be described. The rear bulged portion 121 bulged rearwards beyond the support pipe 62 constituting the mount portion for mounting an upper portion of the rear cushion 64 to the rear end of the rear seat 33 and a rear portion of the vehicle body frame F is provided at a rear portion of the luggage box 30 including the front helmet containing portion 119, which is disposed on the lower side of the front seat 32 possessed by the tandem type rider's seat 31, and the rear helmet containing portion 120 which is disposed on the lower side of the rear seat 33 possessed by the rider's seat 31. Therefore, it is possible to increase the inside volume of the luggage box 30 in the manner of making it possible to contain in the luggage box 30 a long article such as a golf club extending rearwards beyond the rear end of the rider's seat 31. Moreover, small articles other than the helmet can be contained in a rear portion of the luggage box 30, so that articles not used frequently, such as tools, can be preferably contained in the rear portion of the luggage box 30.

In addition, since the rear bulged portion 121 is bulged rearwards to nearly the same position as the rear end of the grab rail 118 disposed around the rear seat 33, the inside volume of the luggage box 30 can be increased, and a rear portion of the luggage box 30 can be protected with the grab rail 118.

Besides, since the small width portion 121a coming between the left and right tail light units 123, 123 in top plan view is provided at a rear portion of the rear bulged portion 121, the inside volume of the luggage box 30 can be increased by effectively utilizing the space generated between the left-right pair of tail light units 123, and it is easier to form the space for bulb replacement of the tail light units 123.

Meanwhile, the luggage box 30 has the top cover 111 disposed on the lower side of the rear seat 33, and a containing space 128 which can be utilized according to the attachment and detachment of the rear seat 33 is formed on the upper surface of the top cover 111. Therefore, a space for containing small articles, other than the inside of the luggage box 30, can be secured while obviating an increase in the number of component parts and a complexed structure. In addition, since the containing space 128 is formed in a first rib 127 erected on the top cover 111 and endlessly continued and a second rib 129 endlessly continued so as to form a labyrinth structure in cooperation with the first rib 127 droops down from the bottom plate 33a of the rear seat 33, penetration of rainwater, dust or the like from the surroundings of the containing space 128 can be prevented with a simple structure.

Moreover, the illuminating tool 116 for illuminating the inside of the luggage box 30 is attached to the inside surface of the luggage box 30 at a portion corresponding to a front portion of the top cover 111, and the inside of a rear portion of the luggage box 30 which tends to be darkened by the provision of the top cover 111 can be effectively illuminated without being obstructed by things contained in the rear portion of the luggage box 30. Further, the inside surface of the luggage box 30 is easily visible at the portion corresponding to a front portion of the top cover 111, so that breakage of a bulb in the illuminating tool 116 and the like can be confirmed easily.

In addition, since the rear upper cover 165 and the rear center cover 166 which cover the rear bulged portion 121, the left-right pair of tail light units 123, and the rear fender 181 are attached to the rear bulged portion 121, a plurality of members disposed in the surroundings of a rear portion of the luggage box 30 can be removed at a stroke, by only detaching the wirings for the tail light units 123, so that maintainability is enhanced.

The luggage box 30 includes the shallow bottom portion 110c disposed between the front helmet containing portion 119 and the rear helmet containing portion 120, and throttle body 68 to which the control box 76 containing the controller 75 is annexed and the fuel injection valve 74 are disposed on the lower side of the shallow bottom portion 10c, with their top end positions being substantially the same. Therefore, by forming the shallow bottom portion 110c between the front and rear helmet containing portions 119 and 120 in a flat shape, it can be effectively utilized as an article container, and, moreover, a part of an intake system of the engine E can be effectively disposed in the space on the lower side of the shallow bottom portion 110c.

A lower portion of the rear bulged portion 121 is disposed on the lower side relative to the mount portion for mounting an upper portion of the rear cushion 64 onto a rear portion of the vehicle body frame F in such a manner that the article containing portion 124, in which the raised portion 110d formed by partially raising upwards the bottom wall of the luggage box 30 is intermediately disposed between the article containing portion 124 and the rear helmet containing portion 120, is formed inside the rear bulged portion 121. Thus, the rear helmet containing portion 120 and the article containing portion 124 on the rear side relative to the rear helmet containing portion 120 are partitioned from each other by the raised portion 110d, whereby it is possible to contrive an enhanced convenience in use, and to inhibit, by the raised portion 110d, small articles contained in the article containing portion 124 on the rear side from moving in the front-rear direction.

In addition, since the fuel tank 28 elongate in the vertical direction in side view is disposed on the front side of the luggage box 30 and the front bulged portion 122 bulged forwards to the vicinity of a bottom portion of the fuel tank 28 is provided at a lower portion of the front end of the luggage box 30, it is possible to form the front portion of the luggage box 30 in a deep shape, thereby to facilitate containing of long articles, and to increase the inside volume of the luggage box 30.

Moreover, since the battery 147 and other electrical equipments 148 to 150 are contained in the front bulged portion 122, the battery 147 and the electrical equipments 148 to 150 can be contained in the luggage box 30 in such a manner as not to obstruct the containing of the helmet H1 and the like.

In addition, the second maintenance lid 151 for partitioning the inside of the front bulged portion 122 and the front helmet containing portion 119 from each other is openably and closably attached to the luggage box 30, whereby it is possible to prevent the things contained in the front bulged portion 122 and the helmet H1 contained in the front helmet containing portion 119 from being damaged through mutual contact.

Furthermore, since a lower portion of a damper rod 152 extending vertically so as to assist the opening and closing operations of the front seat 32 is contained in the front bulged portion 122, it is unnecessary to secure a space for disposing the damper rod 152 on the outside of the luggage box 30. Moreover, when the front seat 32 is opened, it is possible to prevent the putting of things into the luggage box 30 from being obstructed, to obviate to the utmost the exposing of the damper rod 152 to the exterior, and to enhance appearance properties.

The fuel tank 28 and the radiator 29 are disposed on the lower side of the floor tunnel portion 167 formed of a part of the vehicle body cover 34 covering the vehicle body frame F. The vehicle body frame F includes the head pipe 27, the left-right pair of upper down frames 37 extending rearwardly downwards from the head pipe 27, and the left-right pair of lower down frames 38 having the inclined portions 38a extending rearwardly downwards from the head pipe 27 on the lower side relative to the connection portions, for connection to the head pipe 27, of the upper down frames 37. The fuel tank 28 extending vertically over the range from the rear side of a lower portion of the head pipe 27 to lower portions of both the lower down frames 38 is disposed in the space which is surrounded by both the upper down frames 37 and both the lower down frames 38 and which is located immediately on the rear side of the front wheel WF.

Therefore, by disposing the vertically elongate fuel tank 28 immediately on the rear side of the front wheel WF, it is possible to obviate the problem that the area corresponding to a lower portion of the head pipe 27 would be a dead space, and to dispose the component parts while effectively utilizing the space on the lower side of the floor tunnel portion 167. Moreover, the fuel tank 28 comparatively heavy in weight is disposed close to the front wheel WF, whereby it is possible to enhance the distributed load of the front wheel WF, and to contrive a higher turning performance. Besides, since the vertically elongate fuel tank 28 can show a comparatively large residual amount height in the condition where the residual fuel amount is small, this arrangement is profitable for suction of the pump in the case where the pump unit 97 is additionally provided, as in this embodiment.

In addition, since the radiator 29 is disposed on the rear side of the fuel tank 28 and the battery 147 is disposed between the radiator 29 and the fuel tank 28, the vertically elongate shape of the fuel tank 28 makes it possible to set the space on the rear side of the fuel tank 28 to be comparatively broad, and to dispose the battery 147 as a heavy body at the center in the front-rear direction of the vehicle body, thereby contributing to enhancement of drivability. Besides, by disposing the battery 147 between the heat-radiating radiator 29 and the fuel tank 28, it is possible to prevent the influences of the heat coming from the radiator 29 from being exerted on the fuel tank 28.

Since the pump unit 97 contained and disposed in a lower portion of the inside of the fuel tank 28 is attached to the fuel tank 28 from the back side of the fuel tank 28, the pump unit 97 can be attached to the fuel tank 28 so as not to be influenced by steps present in the road surface.

Moreover, since the pump unit 97 is attached to the fuel tank 28 with its rotational axis inclined forwardly downwards, the suction port of the pump unit 97 is disposed close, as much as possible, to the bottom portion of the fuel tank 28, whereby the dead residual amount of the fuel in the fuel tank 28 can be minimized.

In addition, the reservoir tank 104 of the radiator 29 is disposed on the lower side of the step floor 159 constituting a part of the vehicle body cover 34, and the water supply port of the reservoir tank 104 is disposed on the lower side of the first maintenance lid 117 detachably attached to the bottom wall of the luggage box 30 arranged on the lower side of the rider's seat 31. Therefore, by disposing the radiator 29 on the rear side of the fuel tank 28, it is easy to set the water supply port 107 of the radiator 104 to front on the bottom portion of the rider's seat 31, whereby the water supply port 107 can be disposed at a higher position than that in the case where the water supply port fronts on the step floor 159 or the like located directly above the reservoir tank 104, and workability in a water supplying operation can be improved.

Moreover, since the water supply port forming member 108 forming the water supply port 107 is supported by the mount portion 54, for mounting onto the vehicle body frame F side, of the tension rod 53 provided between the vehicle body frame F and the unit swing engine UE swingably borne on the vehicle body frame F, it is possible to support the water supply port forming member 108, while making it unnecessary to apply a special contrivance for supporting the water supply port forming member 108.

Furthermore, the fuel from the fuel tank 28 is supplied to the fuel injection valve 74, and, by use of the pump unit 97 annexed to the fuel tank 28 with the residual amount height set to be comparatively high in the condition where the residual fuel amount is small, the fuel in the fuel tank 28 can be effectively supplied to the fuel injection valve 74.

The swing arm 48 disposed on the right side of the rear wheel WR to support the rear wheel WR is formed in a roughly triangular shape in side view, and the brake caliper 85 of the rear brake 84 is supported by the swing arm 48. In this case, since the opening portion 81 is provided at a roughly central portion of the swing arm 48 and the brake caliper 85 is disposed in the opening portion 81, it is possible to dispose the brake caliper 85 at a comparatively low position, and to thereby contrive a lowering of the center of gravity of the motor scooter type vehicle. Besides, since the surroundings of the brake caliper 85 are surrounded by the swing arm 48, it is possible to secure a substantial width in the vertical direction of the swing arm 48 in side view, and to enhance vertical rigidity and torsional rigidity.

In addition, since the exhaust muffler 78 is disposed on the outer side of the swing arm 48 so as to cover the brake caliper 85 from the outer side, appearance properties can be enhanced.

Moreover, since the opening portion 81 is so formed that its vertical width is gradually reduced rearwards and the brake caliper 85 disposed in a rear portion of the opening portion 81 is supported by the swing arm 48 on the rear side of the opening portion 81, the mount rigidity of the brake caliper 85 can be enhanced by supporting the brake caliper 85 on a high rigidity portion of the swing arm 48.

Furthermore, lower portions of the exhaust muffler 78 are fastened to the swing arm 48 at two locations on both the front and rear sides of the axle 80 of the rear wheel WR, and the axle 80 and the fastening portion, for fastening to the swing arm 48, of the rear cushion 64 provided between the swing arm 48 and the vehicle body frame F are disposed between the straight line L connecting between the fastening portions and the exhaust muffler 78. Therefore, it is possible to facilitate the mounting of the exhaust muffler 78 and the rear cushion 64 onto the swing arm 48, to make the axle 80 and the fastening portions difficult to see from the upper side of side surfaces of the motor scooter type vehicle, and thereby to enhance the appearance properties.

The electric motor 42 for varying the speed change ratio of the non-stage transmission M disposed between the engine E and the rear wheel WR is disposed on the lower side of the passenger's step 162 provided at a rear portion of the step floor 159 possessed by the vehicle body cover 34, so that it is possible to the lowering of the center of gravity of the motor scooter type vehicle by disposing the electric motor 42 at a comparatively low position.

In addition, since the non-stage transmission M is a belt-type one which constitutes the unit swing engine UE together with the engine E having the axis of the cylinder 45 set substantially horizontal and the electric motor 42 is disposed on the front side relative to the non-stage transmission M and on a lateral side of the cylinder 45, the electric motor 42 can be protected by the cylinder 45 of the engine E and the non-stage transmission M. Moreover, since the vehicle body frame F is provided with the support frame 41 for supporting the step floor 159 from the lower side and the electric motor 42 is disposed on the lower side relative to the support frame 41, the electric motor 42 can be protected more effectively by the support frame 41 which is high in rigidity.

Furthermore, since the electric motor 42 is disposed with its rotational axis directed in the vehicle width direction, the electric motor 42 can be disposed on a lateral side of the cylinder 45 possessed by the engine E, in such a manner as not to protrude outwards beyond the outside surface of the non-stage transmission M.

The grab rail 118 is attached to a rear portion of the vehicle body frame F, and the back rest 135 which is formed in a roughly streamline shape provided at its top surface with the front inclined surface 135a inclined forwardly downwards in side view and the rear inclined surface 135b inclined rearwardly downwards in side view and which is attached to the upper surface of a rear portion of the grab rail 118 is disposed on the rear side of the rear seat 33 possessed by the rider's seat 31.

Therefore, a waist portion of the passenger seated on the rear seat 33 can be securely held by the front inclined surface 135a inclined forwardly downwards, of the upper surface of the back rest 135. In addition, since the back rest 135 is in the roughly streamline shape in side view, the appearance properties of the back rest 135 can be enhanced, and an enhanced aerodynamic performance can be contrived. Besides, since the rear inclined surface 135b inclined rearwardly downwards, of the upper surface of the back rest 135, can be utilized, the luggage protruding rearwards from the rear seat 33 can be mounted on the back rest 135.

In addition, since the back rest 135 is so formed that its width is gradually reduced rearwards in side view, it is possible to form the back rest 135 in a compact form, which, in cooperation with the shape of the vehicle body cover 34, makes it possible to secure harmony on a design basis, and to enhance the aerodynamic performance.

Furthermore, since the upper surface of a rear portion of the grab rail 118 is set at substantially the same height as the upper surface of the rear seat 33 and the back rest 135 is detachably attached to the upper surface of the rear portion of the grab rail 118, luggage can be loaded by effectively utilizing the upper surface of the rear portion of the grab rail 118 upon removal of the back rest 135 at the time when it is desired to load more luggage on the rear seat 33.

The first article containing portion 191 which is configured in the drawer type having the containing case 193 removable by drawing out of the leg shield 158 possessed by the vehicle body cover 34 and the second article containing portion 192 in which the containing recessed portion 214 formed in the leg shield 158 is openably and closably covered with the lid member 215 hinged to the leg shield 158 are disposed in the leg shield 158, in the state of being divided into left and right portions, so that articles can be contained in the leg shield 158 while effectively utilizing the space in the leg shield 158 which is comparatively broad. Moreover, since the containing case 193 is formed to be larger than the containing recessed portion 214, a comparatively large amount of articles can be contained in the first article containing portion 191. In this case, since the first article containing portion 191 is of the drawer type, there is no possibility that the articles in the inside of the containing case 193 might come out to the exterior when the lid is opened, and articles can be contained in the containing case 193 in such a manner as to fill up the inside of the containing case 193. In addition, when the containing case 193 is removed from the leg shield 158, the leg shield 158 can be provided with the comparatively large opening portion 196, whereby it is easy to perform maintenance of the bulb 171a of the headlight 171 disposed on the front side relative to the first article containing portion 191, or the like.

In addition, the locking mechanism 208 capable of changeover between connection of the containing case 193 of the first article containing portion 191 to the leg shield 158 and release of the connection according to a key operation from the key hole 207 fronting on the front surface of the containing case 193 is provided between the containing case 193 and the leg shield 158, and it is enabled to draw out the containing case 193 by inserting a key into the key hole 207 of the locking mechanism 208 and operating the key. Therefore, it is possible to contrive prevention of the articles contained in the first article containing portion 191 from being stolen, and to draw out the containing case 193 by using the key as a handle, so that it is unnecessary to provide the containing case 193 with a handle, and more luggage can be contained in the first article containing portion 191.

Moreover, the containing case 193 is so formed that, when in the stored state, it covers the head pipe 27 from one of the left and right sides, and the locking mechanism 208 is disposed at a position opposed to the head pipe 27 from the rear side. Therefore, the containing capacity of the containing case 193 can be set larger, by effectively disposing the locking mechanism 208 in the space on the rear side of the head pipe 27.

Furthermore, the handle lock module 211 capable of making the steering operation of the steering handle 26 impossible is disposed on the opposite side of the first article containing portion 191 and in the vicinity of the head pipe 27, and the second article containing portion 192 is so disposed that the handle lock module 211 is located between itself and the first article containing portion 191. Therefore, the space in the leg shield 158 which is comparatively broad can be effectively utilized, by arranging the first article containing portion 191, the handle lock module 211 and the second article containing portion 192 in the leg shield 158.

In addition, since the transmission antenna 225 is disposed at a position spaced from the handle lock module 211, the degree of freedom in arranging the transmission antenna 225 can be enhanced.

Besides, since the reception unit 227 is disposed in the luggage box 30 or in the rider's seat 31 and is disposed in the luggage box 30 in this embodiment, it is possible to secure environmental resistance properties of the reception unit 227 corresponding to mud, dust, water, external forces, etc., while making it unnecessary to cover the reception unit 227 with a cover member formed of a synthetic resin; therefore, it is also possible to secure waterproofness while unnecessitating a readjustment of the reception unit 227.

Moreover, the reception unit 227 has a structure in which the substrate 229 provided with the antennas 230, 230 on one side thereof and with the reception circuit 231 on the other side thereof, so that it is possible to configure the reception unit 227 in a compact form, and to minimize the space required for disposing the reception unit 227 in the luggage box 30.

Furthermore, the first maintenance lid 117 for performing maintenance relating to the engine E disposed on the lower side of the luggage box 30 is openably and closably provided in the bottom wall of the luggage box 30, and the reception unit 227 is disposed in the luggage box 30 in the manner of being covered with a part of the first maintenance lid 117. Therefore, the reception unit 227 can be disposed at a position suitable for maintenance, while preventing the reception unit 227 from interfering with the articles contained in the luggage box 30.

In addition, the emergency unlocking key cylinder lock 236 for enabling at least the starting of the engine E and the unlocking the steering handle while making the portable transmitter 226 unnecessary is disposed in the leg shield 158, so that the motor scooter type vehicle can be run by operating the emergency unlocking key cylinder lock 236 with an emergency unlocking mechanical key, even if the vehicle user has lost the portable transmitter 226 or if the battery life in the portable transmitter 226 is expired.

Moreover, the second article containing portion 192 is provided in the leg shield 158 on the right side of the handle lock module 211, the key hole 238 of the emergency unlocking key cylinder lock 236 fronts on the inside surface of the containing recessed portion 214 in the second article containing portion 192, and the containing recessed portion 214 is closed with the lid member 215 at normal time. Therefore, it is possible to dispose the key hole 238 at such a position as to be difficult to see, and to obviate to the utmost the key hole 238 of the emergency unlocking key cylinder lock 236 from undergoing mischief.

Furthermore, the link mechanism 234 connected to the seat catcher 142 for changeover between the seat catch condition where the front seat 32 capable of opening the luggage box 30 is held in the closed state and the seat catch release condition where operations of opening and closing the front seat 32 are possible is connected to the seat lock actuator 228 operated according to the operation upon reception of a signal from the normal portable transmitter 226, and is connected to the emergency unlocking key cylinder lock 236. Therefore, when the link mechanism 234 for operating the seat catcher 142 is used in common in the case where the portable transmitter 226 is valid and in the case where the emergency unlocking key cylinder lock 236 is used, it is possible to reduce the number of component parts.

While the embodiment of the present invention has been described above, the present invention is not limited to the above embodiment, and various design modifications are possible without departure from the present invention as defined in the claims. For example, the present invention is applicable also to other motorcycles than the motor scooter type vehicle.

We claim:

1. A motorcycle comprising a fuel tank and a radiator both disposed on a lower side of a floor tunnel portion disposed in an area ranging from a rear side of a head pipe for steerably bearing a front wheel and a steering handle to a lower side of the front end of a rider's seat, wherein said fuel tank extending vertically in the area ranging from the rear side of a lower portion of said head pipe to lower portions of a left-right pair of lower down frames having inclined portions extending rearwardly downwards from said head pipe on the lower side relative to connection portions for connection to said head pipe, of a left-right pair of upper down frames extending rearwardly downwards is disposed in a space which is surrounded by said upper down frames and said lower down frames and which is located immediately on a rear side of said front wheel, and wherein said radiator is disposed on a rear side of said fuel tank, and a battery is disposed between said radiator and said fuel tank.

2. A motorcycle comprising a fuel tank and a radiator both disposed on a lower side of a floor tunnel portion disposed in an area ranging from a rear side of a head pipe for steerably bearing a front wheel and a steering handle to a lower side of the front end of a rider's seat, wherein said fuel tank extending vertically in the area ranging from the rear side of a lower portion of said head pipe to lower portions of a left-right pair of lower down frames having inclined portions extending rearwardly downwards from said head pipe on the lower side relative to connection portions for connection to said head pipe, of a left-right pair of upper down frames extending rearwardly downwards is disposed in a space which is surrounded by said upper down frames and said lower down frames and which is located immediately on a rear side of said front wheel, and wherein a pump unit contained and disposed in a lower portion of the inside of said fuel tank is attached to a back side of said fuel tank via a pump unit insertion mount hole provided on the back surface of the lower portion of said fuel tank.

3. A motorcycle as set forth in claim 2, wherein said pump unit is attached to said fuel tank with its rotational axis inclined forwardly downwards.

4. A motorcycle as set forth in claim 1, a reservoir tank of said radiator is disposed on a lower side of a step floor constituting a part of a vehicle body cover, and a water supply port of said reservoir tank is disposed on a lower side of a maintenance lid detachably attached to a bottom wall of a luggage box disposed on a lower side of said rider's seat.

5. A motorcycle as set forth in claim 4, wherein a water supply port forming member forming said water supply port is supported by a mount portion, for mounting to the vehicle body frame side, of a tension rod provided between said vehicle body frame and a unit swing engine swingably borne on said vehicle body frame.

6. A motorcycle as set forth in claim 1, comprising a fuel injection valve for injecting a fuel supplied from said fuel tank.

7. A motorcycle as set forth in claim 2, comprising a fuel injection valve for injecting a fuel supplied from said fuel tank.

* * * * *